US007328353B2

(12) United States Patent
Yamauchi et al.

(10) Patent No.: US 7,328,353 B2
(45) Date of Patent: Feb. 5, 2008

(54) CONTENT DISTRIBUTION SYSTEM

(75) Inventors: Kenichiro Yamauchi, Kyoto (JP); Ryuichiro Tanaka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 762 days.

(21) Appl. No.: 10/360,853

(22) Filed: Feb. 10, 2003

(65) Prior Publication Data

US 2003/0154390 A1   Aug. 14, 2003

(30) Foreign Application Priority Data

Feb. 14, 2002   (JP)   ............................. 2002-037490

(51) Int. Cl.
*G06F 11/30* (2006.01)
*G06F 12/14* (2006.01)
*H04L 9/32* (2006.01)

(52) U.S. Cl. ...................... 713/193; 715/514; 711/170; 726/26

(58) Field of Classification Search ................. 713/193, 713/176; 726/30, 31, 26; 380/33, 227; 715/514
See application file for complete search history.

(56) References Cited

U.S. PATENT DOCUMENTS

| | | | | |
|---|---|---|---|---|
| 5,701,582 A * | 12/1997 | DeBey | ....................... | 725/103 |
| 5,892,900 A * | 4/1999 | Ginter et al. | ................... | 726/26 |
| 6,343,274 B1 * | 1/2002 | McCollom et al. | ............ | 705/26 |
| 6,370,553 B1 * | 4/2002 | Edwards et al. | ............. | 715/514 |
| 6,983,371 B1 * | 1/2006 | Hurtado et al. | .............. | 713/189 |
| 7,039,784 B1 * | 5/2006 | Chen et al. | .................. | 711/170 |
| 2002/0010681 A1 * | 1/2002 | Hillegass et al. | ............. | 705/59 |
| 2002/0162109 A1 * | 10/2002 | Shteyn | ......................... | 725/87 |
| 2002/0194108 A1 * | 12/2002 | Kitze | .......................... | 705/37 |
| 2004/0103164 A1 * | 5/2004 | Tabuchi et al. | .............. | 709/212 |

FOREIGN PATENT DOCUMENTS

JP   09-149354   6/1997
JP   2002-026942 A   1/2002

\* cited by examiner

*Primary Examiner*—Kambiz Zand
*Assistant Examiner*—Jason K. Gee
(74) *Attorney, Agent, or Firm*—McDermott Will & Emery LLP

(57) ABSTRACT

In a content distribution system, a recording-management system makes a storing section of a first terminal device store a predetermined content stored in a content-storing section of a distribution device obligatorily. Under this condition, when a second terminal device requests the recording management system to distribute the predetermined content, the recording management system transmits the address identifying the first terminal device that stores the predetermined content to the second terminal device. The content stored in the first terminal device is transmitted and received between the second terminal device and the first terminal device having the received address through a user network to obtain the predetermined content. Thus, the content requested by a given terminal device can be distributed to the terminal device that has made the request without increasing the scale of the distribution device.

32 Claims, 9 Drawing Sheets

CONTENT DISTRIBUTION SYSTEM

BACKGROUND OF THE INVENTION

The present invention relates to content distribution systems equipped with a terminal device having a storage section storing video, audio, or the like, and a distribution device transmitting content to the terminal device.

In a content distribution system that distributes contents, such as digital video and digital audio compressed according to MPEG, to terminal devices by utilizing a digital broadcasting system and a high-speed network, terminal devices can receive and reproduce the distributed contents and can store in storing devices connected to the terminal devices, such as DVDs or hard disks. The contents stored in the storing devices that are provided for the terminal devices can be reproduced at different times for the respective terminal devices.

FIG. 10 shows the configuration of a conventional content distribution system 9. The content distribution system 9 has a distribution device 97 and a plurality of terminal devices 95 that are connected to each other by a distribution network 2 and a management network 3. The distribution device 97 has a content-storing section 93 in which contents are stored, and it distributes the contents stored in the content-storing section 93 to the plurality of terminal device 95 through the distribution network 2. The distributed contents are stored in the storing section 98 provided in each of the terminal devices.

In the content distribution system 9 having such a configuration, as the distribution device 97 reads out a content stored in the content-storing section 93 and distributes it to the plurality of terminal device 95 through the distribution network 2, each of the terminal devices 95 receives and reproduces the distributed content. Each of the terminal devices 95 stores the received content into the storing section 98, and it reproduces the content stored in the storing section 98 at a date and hour different from the date and hour at which the contents are received.

When a desired content is neither being distributed from the distribution device 97 nor stored in the storing section 98 provided in the terminal device 95, the terminal device 95 requests the distribution device 97 to send the desired content through the management network 3. The distribution device 97 reads out the requested content from the content-storing section 93, and transmits the content to the terminal device 95 that has made the request through the distribution network 2. The terminal device 95 that has received the requested content reproduces the content and/or stores it into the storing section 98.

When a plurality of terminal devices 95 request the distribution device 97 to send different contents, it is possible that there will be a shortage of transfer band of the distribution network 2 that is used to distribute the different contents to each of the terminal devices 95. Especially, when video or audio contents compressed according to the MPEG standard are attempted to distribute, the distribution device 97 is required to have an extremely large transmission capability because such contents have a very large file size. For example, when different 5 Mbps video data of MPEG-2 MP@ML are attempted to distribute to 10 terminal devices 95, the distribution device 97 needs to transmit video data of about 50 Mbits per 1 second.

As a solution to this problem, the following techniques (1) to (4) have been known.

(1) The transmission capability of the distribution device 97 is increased.

(2) The number of terminal devices 95 is restricted according to the transmission capability of the distribution device 97.

(3) An upper limit is set for the data amount of the content to be distributed by the distribution device 97.

(4) The contents that a terminal device 95 can request are restricted to those with a small file size.

When the transmission capability of the distribution device 97 is increased according to the technique (1) above, the scale of the distribution device 97 becomes very large. In addition, at least one of the above techniques (2) through (4) must be employed at the same time because an upper limit must be set for the transmission capability of the distribution device 97, although the scale of the distribution device 97 becomes very large.

In the above technique (2), the number of terminal devices 95 is restricted, and for this reason, if contents are to be distributed to a greater number of terminal devices than the restricted number, it is necessary to provide two or more of the content distribution systems 9 shown in FIG. 10.

In the above technique (3), the data amount of contents has an upper limit, and therefore, high quality video or audio having a larger data amount than the set upper limit of data amount cannot be distributed.

In the above technique (4), the content that a terminal device 95 can request is restricted to, for example, a content having a small file size.

SUMMARY OF THE INVENTION

In view of the foregoing and other problems, it is an object of the present invention to provide a content distribution system that can distribute a desired content to a given terminal device in response to a request from the terminal device without such limitations as the scale of the distribution device, the number of terminal devices, and the data amount and the file size of the content.

In order to achieve the foregoing and other objects, the present invention newly provides a recording management system in a content distribution system, and the recording management system allows a terminal device to store a predetermined content or allows a plurality of terminal devices to store the content so that the single content is distributed over all the plurality of terminal devices; when a given terminal device makes a distribution request for the predetermined content, the recording management system transmits only the address/addresses of one or a plurality of terminal devices that stores/store the content to the terminal device that has made the request so that the predetermined content is transmitted and received between the terminal device that has made the request and the terminal device(s) that stores/store the content.

More specifically, the present invention provides a content distribution system comprising: a plurality of terminal devices; a distribution device for storing predetermined contents and distributing the contents; and a recording management system; wherein the recording management system makes the distribution device distribute one of the predetermined contents and allows one of the terminal devices to store the content or allows the plurality of terminal devices to store the content so that the content is distributed over all the plurality of terminal devices; and wherein, when any one of the terminal devices requests distribution of the content stored in the one or the plurality of the terminal devices, the recording management system manages transmission and reception of the stored content between the terminal device that has made the request and the one or the plurality of the terminal devices that stores/store the content.

Preferably, in the above-described content distribution system, the recording management system comprises a content-dividing section that allows a plurality of the terminal devices to store a single content so that a plurality of sub-contents, separated from a content distributed from the distribution device, are stored in the plurality of the terminal devices.

Preferably, in the above-described content distribution system, the plurality of terminal devices include a plurality of first terminal devices; the plurality of first terminal devices and the recording management system are connected by a management network; the recording management system transmits content storage control information for specifying a content to be stored to each of the first terminal devices through the management network; and the content-dividing section of the recording management system transmits, to each of the first terminal devices through the management network, separate storing information that specifies a predetermined sub-content in the content specified by the content storage control information for each the first terminal devices; wherein each of the first terminal devices comprises: a receiving section connected to the distribution device through a distribution network, the receiving section receiving predetermined contents from the distribution device; a storing section; a managing section connected to the management network, the managing section receiving the content storage control information sent from the recording management system and the separate storing information sent from the content-dividing section and storing a sub-content into the storing section, the sub-content corresponding to the received separate storing information among the plurality of sub-contents that consists of the content corresponding to the received content storage control information among the contents received by receiving section.

Preferably, in the above-described content distribution system, the plurality of terminal devices include a second terminal device that makes a request for distribution of a content; the content-dividing section of the recording management system transmits, to the second terminal device, addresses of the plurality of the first terminal devices that store the content when the content-dividing section receives a content distribution-requesting signal from the second terminal device; and the content-dividing section of the recording management system allows the second terminal device and the first terminal devices having the received addresses to transmit and receive the content stored in the first terminal devices therebetween.

Preferably, in the above-described content distribution system, the second terminal device comprises: a managing section connected to the management network, the managing section transmitting a distribution-requesting signal for requesting distribution of a content to the recording management system; and a reproducing section for reproducing the content; wherein the content-dividing section of the recording management system transmits addresses of the first terminal devices that store the content to the managing section of the second terminal device when the content-dividing section receives the distribution-requesting signal from the second terminal device; wherein the first terminal device has a first transmitting-and-receiving section; wherein the second terminal device has a second transmitting-and-receiving section connected to the first transmitting-and-receiving section of each of the first terminal devices through a user network; wherein the second transmitting-and-receiving section of the second terminal device transmits a sub-content-requesting signal for requesting a sub-content through the user network to the first terminal devices having the addresses received by the managing section; and wherein the first transmitting-and-receiving section of each of the first terminal devices transmits the sub-content stored in the storing section through the user network to the second transmitting-and-receiving section of the second terminal device that has transmitted the sub-content-requesting signal.

Preferably, in the above-described content distribution system, the distribution network includes broadcasting.

Preferably, in the above-described content distribution system, the distribution network includes at least one of the Internet and a local area network.

Preferably, in the above-described content distribution system, the management network comprises at least one of the Internet and a local area network.

Preferably, in the above-described content distribution system, the user network comprises at least one of the Internet and a local area network.

Preferably, in the above-described content distribution system, the separate storing information contains bit-position-specifying information that specifies a bit position for each of the first terminal devices; each of the first terminal device comprises a bit-separating section that generates the plurality of sub-contents by dividing the content received by the receiving section for each bit and selects one of the plurality of sub-contents divided for each bit based on the bit position specified by the bit-position-specifying information for each of the first terminal devices; and one of the plurality of sub-contents that has been selected by the bit-separating section is stored in the storing section.

Preferably, in the above-described content distribution system, the plurality of sub-contents are separated from the content in the unit of predetermined reproduction time.

Preferably, in the above-described content distribution system, the plurality of sub-contents are separated from the content in the unit of predetermined file size.

Preferably, in the above-described content distribution system, the recording management system has a content encryption key-generating section that generates a content encryption key for encrypting the contents in the distribution device; the recording management system transmits the content encryption key generated by the content encryption key-generating section to each of the first terminal devices to each of the first terminal devices through the management network; and each of the first terminal devices encrypts the content received by the receiving section based on the content encryption key transmitted from the recording management system through the management network.

Preferably, in the above-described content distribution system, the content encryption key-generating section generates a different content encryption key for each content.

Preferably, in the above-described content distribution system, the recording management system has an encrypting section that encrypts the content encryption key generated by the content encryption key-generating section to be an encrypted content encryption key; the recording management system transmits the encrypted content encryption key encrypted by the encrypting section to each of the first terminal devices through the management network; each of the first terminal devices has an encryption key-decrypting section that decrypts the encrypted content encryption key transmitted from the recording management system to obtain the content encryption key; and each of the first terminal devices encrypts the content received by the receiving section based on the content encryption key decrypted by the encryption key-decrypting section.

Preferably, in the above-described content distribution system, the recording management system has separate encryption key-generating section that generates a plurality of separate encryption keys for encrypting the plurality of sub-contents; the recording management system respectively transmits the separate encryption keys generated by the separate encryption key-generating section through the management network to the different first terminal devices; and each of the first terminal devices encrypts the sub-content corresponding to the received separate storing information based on the separate encryption key transmitted from the recording management system through the management network and stores the sub-content into the storing section.

Preferably, in the above-described content distribution system, the recording management system comprises an authentication section that authenticates a second terminal device that requests distribution of the content.

Preferably, in the above-described content distribution system, the recording management system has a terminal encryption key-storing section that stores terminal encryption keys each uniquely given for each of the terminal devices; and the authentication section compares the terminal encryption key transmitted from the second terminal device that requests distribution of the content and the terminal encryption key stored in the terminal encryption key-storing section to authenticate the second terminal device that requests distribution of the content.

Preferably, in the above-described content distribution system, the recording management system has a user encryption key-generating section that generates a user encryption key for encrypting sub-contents transmitted and received through the user network; each of the first terminal devices encrypts the sub-content stored in the storing section with the user encryption key generated by the user encryption key-generating section to obtain a user encrypted sub-content, and transmits the encrypted sub-content through the user network to the second terminal device that has requested distribution the content; and the second terminal device that has requested distribution of the content decrypts the encrypted sub-content transmitted from the first terminal device through the user network with the user encryption key generated by the user encryption key-generating section.

Preferably, in the above-described content distribution system, the user encryption key-generating section changes a user encryption key to be generated each time one of the second terminal devices makes a request for distribution of a content.

Preferably, in the above-described content distribution system, the storing section of each of the first terminal devices comprises: a shared space that stores a sub-content specified by the recording management system; and a user space that is freely available to a user who owns the first terminal device.

Preferably, in the above-described content distribution system, the storing section of each of the first terminal devices comprises a space-setting section that sets the size of the shared space and the size of the user space.

Preferably, in the above-described content distribution system, the recording management system transmits an instruction signal that instructs the space-setting section on the size of the shared space to the space-setting section.

Preferably, in the above-described content distribution system, the space-setting section sets the size of the shared space according to an instruction from a user who owns the terminal device that has the space-setting section.

Preferably, in the above-described content distribution system, the first terminal device and the second terminal device have their functions in common and the same configuration so that the first terminal device can also function as the second terminal device whereas the second terminal device can also function as the first terminal device.

Preferably, in the above-described content distribution system, the recording management system has a fee charging section that calculates a fee amount that a terminal device is to be charged when the terminal device makes a request for a content to the recording management system as the second terminal device.

Preferably, in the above-described content distribution system, when the terminal device makes a request for a content as the second terminal device, the fee charging section calculates the fee amount that the second terminal device is to be charged based on the number of the first terminal device(s) that stores/store the sub-contents that constitutes the content.

Preferably, in the above-described content distribution system, the fee charging section reduces the fee amount that each of the first terminal devices has been charged when one of the first terminal devices transmits the sub-content to the second terminal device.

Preferably, in the above-described content distribution system, the fee charging section has a record table that records the status of use of the storing section of each of the first terminal devices; and the fee charging section reduces the fee amount that each of the first terminal devices is charged according to the status of use of the storing section of each of the first terminal devices.

Preferably, in the above-described content distribution system, the storing section of each of the first terminal devices has a shared space that stores a content specified by the recording management system and a user space that is freely available to a user who owns the first terminal device; the record table records the size of the shared space and the size of the user space in the storing section of each of the first terminal devices; and the fee charging section reduces the fee amount that each of the first terminal devices is to be charged according to the size of the shared space and the size of the user space.

Preferably, in the above-described content distribution system, the fee charging section has a group list table that records a group list showing a plurality of groups constituted by a plurality of terminal devices; and according to the group list table, the fee charging section evenly adds a fee amount over all the terminal devices that belong to the group to which the second terminal device that has requested the content belongs.

Preferably, in the above-described content distribution system, the group list table is connected to an Internet server; the Internet server is connected to an Internet client; the Internet client edits the group list; and the Internet server registers the group list edited by the Internet client into the group list table.

The present invention also provides a terminal device for use in the above-described content distribution system, the terminal device having both the function that the first terminal device has and the function that the second terminal device has.

The present invention further provides a storing device provided in the first terminal device for use in the above-described content distribution system, the storing section converting the format of the sub-content received by the receiving section into a format different from the format as the sub-content is distributed.

According to the present invention thus described above, a predetermined single content is divided into a plurality of sub-contents, and these sub-contents are distributed to different terminal devices and are stored therein. Thereafter, when one of the terminal devices requests distribution of the predetermined content, the sub-contents are transmitted and received between the terminal device that has made the request and a plurality of the terminal devices that store the sub-contents. Because of this, when a given terminal device requests a content, the distribution device does not need to distribute a content each time a request is made. Thus, the distribution device does not need to have high transmission capability, and moreover, it is unnecessary to restrict the number of terminal devices according to the transmission capability of the distribution device. Furthermore, it is unnecessary to restrict the file size and the data amount of the distributed content to be small.

DETAILED DESCRIPTION OF THE INVENTION

Hereinbelow, preferred embodiments of the invention are described with reference to the drawings.

EMBODIMENT 1

Figure 1:
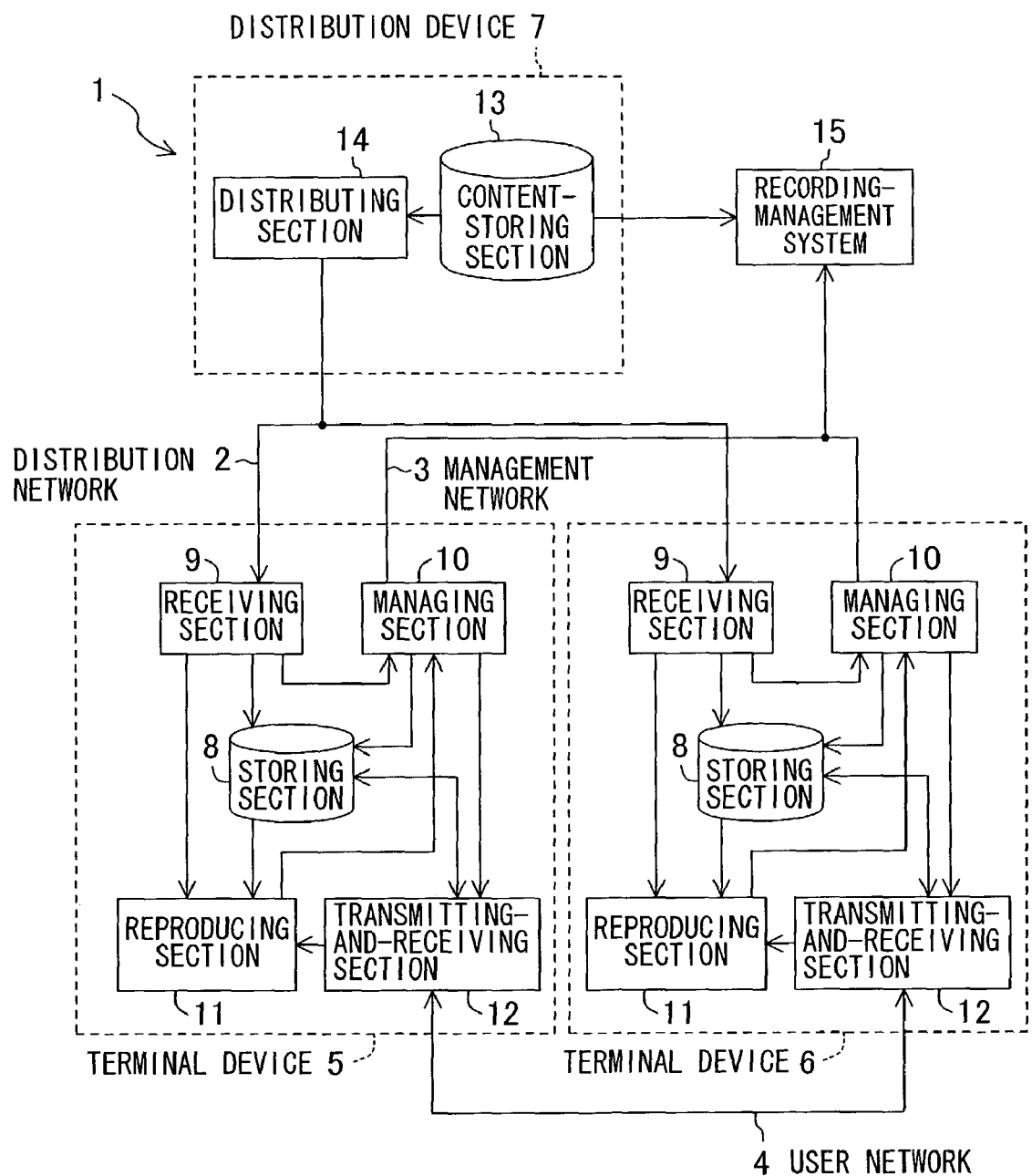
FIG. 1 is a diagram showing the configuration of a content distribution system according to Embodiment 1 of the present invention.

FIG. 1 shows the configuration of a content distribution system 1 according to Embodiment 1 of the invention. The content distribution system 1 comprises a distribution device 7, a recording-management system 15, a terminal device (first terminal device) 5, and another terminal device (second terminal device) 6. The distribution device 7 is connected to the terminal devices 5 and 6 by a distribution network 2. The recording-management system 15 is connected to the terminal devices 5 and 6 by a management network 3. The terminal device 5 and the terminal device 6 are connected to each other by a user network 4.

The distribution device 7 has a content-storing section 13 in which contents such as video and audio are stored. The content-storing section 13 reads out a stored content, then outputs the content to a distributing section 14, and outputs, to the recording management system 15, information that identifies the type, the file size, the reproduction time, and so forth of the content that is read out. The distributing section 14 is connected to the distribution network 2, and it distributes the content that is read out by the content-storing section 13 to both terminal devices 5 and 6 through the distribution network 2. The recording management system 15 is connected to the management network 3. The recording management system 15 transmits content storage control information that identifies the type, the file size, the reproduction time and so forth of the content read out by the content-storing section 13 and that specifies the content to be stored into a terminal device, only to the terminal device 5 into which the content is to be stored through the management network 3.

The terminal device 5 comprises a receiving section 9 that is connected to the distribution network 2. The receiving section 9 receives the content distributed from the distributing section 14 provided in the distribution device 7 through the distribution network 2. The terminal device 5 is provided with a managing section 10 that is connected to the management network 3. The managing section 10 receives content storage control information that specifies the content to be stored in the terminal device 5 from the recording management system 15. The terminal device 5 comprises a storing section 8. Based on the content storage control information received by the managing section 10, the storing section 8 stores the content received by the receiving section 9. The terminal device 5 is also provided with a reproducing section 11 that reproduces the content received by the receiving section 9. The terminal device 5 further has a transmitting-and-receiving section 12 that is connected to the user network 4.

Figure 2:
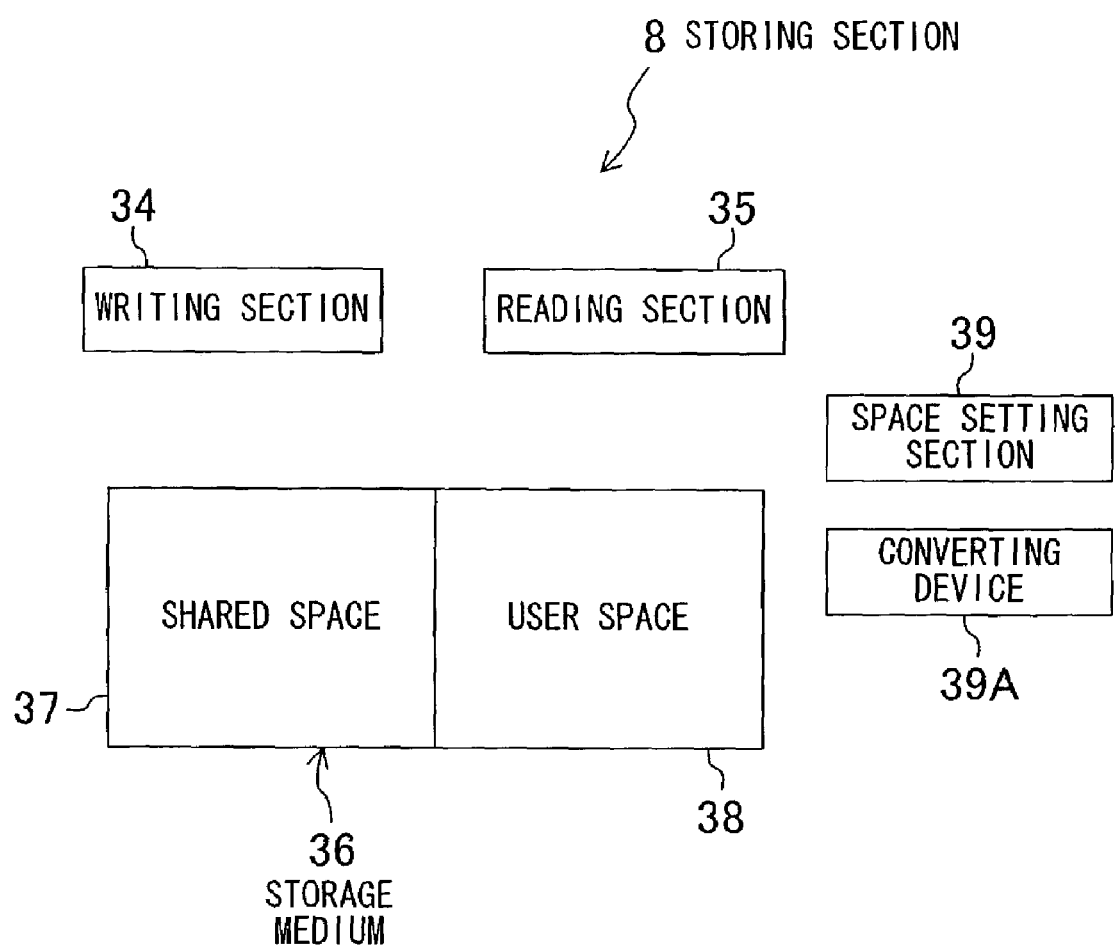
FIG. 2 is a diagram showing the configuration of a storage section provided in the content distribution system according to Embodiment 1 of the present invention.

FIG. 2 shows the configuration of the storing section 8 provided in the terminal device 5. The storing section 8 has a storage medium 36. The storage medium 36 is provided with a user space 38 that is freely available to the user who owns the terminal device 5, and a shared space 37 in which the content identified by the recording management system 15 is stored. The sizes of the user space 38 and the shared space 37 are set by a space-setting section 39. The recording management system 15 transmits an instruction signal that instructs the space-setting section 39 about the size of the shared space 37 to the space-setting section 39 through the management network 3, and the space-setting section 39 sets the size of the shared space 37 as instructed by the recording management system 15. The size of the shared space 37 in the terminal device 5 can also be freely set by an instruction from the user of the terminal device 5. The storing section 8 has a writing section 34. The writing section 34 stores, among the contents received by the receiving section 9, the content corresponding to the content storage control information received by the managing section 10, i.e., the content specified by the recording management system 15, into the shared space 37 of the storage medium 36. The storing section 8 has a reading section 35. In response to the request from the reproducing section 11, the reading section 35 reads out the content stored in the user space 38 and outputs the content to the reproducing section 11. The storing section 8 has a converting device 39A. The converting device 39A converts the content to be stored into another format, for example, from the MPEG 2 format into MPEG 4 format, or it compresses and converts a content in the high-definition television format into a content in the standard definition television format.

The terminal device 6 has the same configuration as that of the above-described terminal device 5. For this reason, details of the configuration of the terminal device 6 will not be further elaborated upon.

Next, the operation of the content distribution system 1 thus configured is described below. The following describes an example in which one predetermined content is stored only into the terminal device 5 in advance and subsequently the other terminal device 6 requests distribution of the predetermined content.

The content-storing section 13 provided in the distribution device 7 reads out a stored content and outputs the read content to the distributing section 14. It also outputs the information that identifies the type, the file size, the reproduction time, and so forth of the read content to the recording management system 15. The distributing section 14 distributes the content read out by the content-storing section 13 to the distribution network 2. The recording management system 15 identifies the type, the file size, the reproduction time, and so forth of the content read out by the content-storing section 13, and transmits the content storage control information that specifies the content to be stored in the terminal device 5 only to the terminal device 5, in which the contents should be stored, through the management network 3.

Next, the operation of the terminal device 5 is discussed. The receiving section 9 provided in the terminal device 5 receives the content distributed from the distributing section 14 through the distribution network 2. The receiving section 9 outputs the information that identifies the received content to the managing section 10. The reproducing section 11 reproduces the content received by the receiving section 9. The managing section 10 receives the content storage control information that specifies the content to be stored in the terminal device 5, from the recording management system 15. The managing section 10 outputs a write signal to the writing section 34 provided in the storing section 8 when the content identified by the information that identifies the content, which is received by the receiving section 9, matches the content specified by the content storage control information received by the managing section 10. Upon receiving the write signal from the managing section 10, the writing section 34 stores the content received by the receiving section 9 into the shared space 37 provided in the storage medium 36.

Next, the operation of the terminal device 6 is discussed. The receiving section 9 provided in the terminal device 6 receives the content distributed from the distributing section 14 through the distribution network 2. The receiving section 9 outputs the information that identifies the received content to the managing section 10. The reproducing section 11 provided in the terminal device 6 reproduces the content received by the receiving section 9.

As already described above, because the recording management system 15 transmits the content storage control information only to the terminal device 5 in which the content is to be stored, the managing section 10 provided in the terminal device 6 does not receive the content storage control information. Accordingly, the content received by the receiving section 9 provided in the terminal device 6 is not stored in the storing section 8 of the terminal device 6.

If a desired content is not being received by the receiving section 9 but is stored in the storing section 8 of the terminal device 6, the reproducing section 11 provided in the terminal device 6 reproduces the desired content that is stored in the storing section 8 of the terminal device 6. If the desired content is neither being received by the receiving section 9 of the terminal device 6 nor stored in the storing section 8 of the terminal device 6, the reproducing section 11 provided in the terminal device 6 outputs, to the managing section 10 provided in the terminal device 6, a content-requesting signal for requesting the desired content. Upon receiving the content-requesting signal output from the reproducing section 11, the managing section 10 requests, through the management network 3, the recording management system 15 to send the desired content. When the request for the desired contents is made from the managing section 10 provided in the terminal device 6, the recording management system 15 transmits a terminal address that identifies the terminal device in which the desired content has already been stored, for example, the terminal device 5, to the managing section 10 provided in the terminal device 6 through the management network 3. The managing section 10 provided in the terminal device 6 transmits the terminal address received from the recording management system 15 to the transmitting-and-receiving section 12 provided in the terminal device 6.

Upon receiving the terminal address from the managing section 10, the transmitting-and-receiving section 12 provided in the terminal device 6 sends out, through the user network 4, a content transfer-requesting signal for requesting the desired content to the transmitting-and-receiving section 12 provided in the terminal device 5 that is identified by the received terminal address.

When the transmitting-and-receiving section 12 provided in the terminal device 5 receives the content transfer-requesting signal, the reading section 35 provided in the storing section 8 of the terminal device 5 reads out the desired content from the user space 38. The transmitting-and-receiving section 12 of the terminal device 5 transfers the desired content read out by the reading section 35 provided in the storing section 8 to the transmitting-and-receiving section 12 provided in the terminal device 6 through the user network 4. The transmitting-and-receiving section 12 provided in the terminal device 6 supplies the transferred desired content to the reproducing section 11 of the terminal device 6. The reproducing section 11 of the terminal device 6 reproduces the desired content supplied from the transmitting-and-receiving section 12.

It should be noted that the transmitting-and-receiving section 12 provided in the terminal device 6 may store the desired content transferred from the terminal device 5 into the storing section 8, and the reproducing section 11 may reproduce the desired content stored in the storing section 8.

The foregoing example illustratively shows that the desired content stored in the terminal device 5 is transferred to the terminal device 6 through the user network 4 and the transferred desired content is reproduced by the terminal device 6, but the present invention is not limited thereto. The desired content stored in the terminal device 6 may be reproduced by the terminal device 5.

The distribution network 2 may be digital broadcasting, LAN (local area network), or the Internet. Specifically, when the distribution network 2 is digital broadcasting, broadcast programs can be used as the contents and the invention makes possible to distribute contents having large file sizes, such as MPEG images.

The management network 3 may be a LAN or the Internet. The use of the Internet for the management network 3 can reduce the cost that is necessary to construct the management network.

The user network 4 may be a LAN or the Internet. The use of the Internet for the use network 4 can reduce the cost that is necessary to construct the user network.

The sizes of the shared space 37 and the user space 38 provided in the write medium 23 of the storing section 8 may be varied for each terminal device. They may be varied in the unit of time.

According to Embodiment 1 thus described, the following are achieved. When the terminal device 6 requests the recording management system 15 to send a desired content, the recording management system 15 transmits the address that specifies the terminal device 5 to the terminal device 6 through the management network 3. When the terminal device 6 requests the terminal device 5 that is specified by the address transmitted from the recording management system 15 to send the desired content through the user network 4, the terminal device 5 transmits the desired content stored in the storing section 8 to the terminal device 6 through the user network 4 and the terminal device 6 reproduces the desired content transmitted from the terminal device 5 through the user network 4. As a consequence, the desired content is directly transferred between the terminal device 5 and the terminal device 6 through the user network 4. Therefore, transmission load on the distribution network 2 can be reduced.

Moreover, because the desired content is directly transferred between the terminal device 5 and the terminal device 6 through the user network 4, load on the distribution network 2 does not increase even if the number of terminal devices increases. Therefore, restriction to the number of terminal devices can be alleviated.

EMBODIMENT 2

Figure 3:
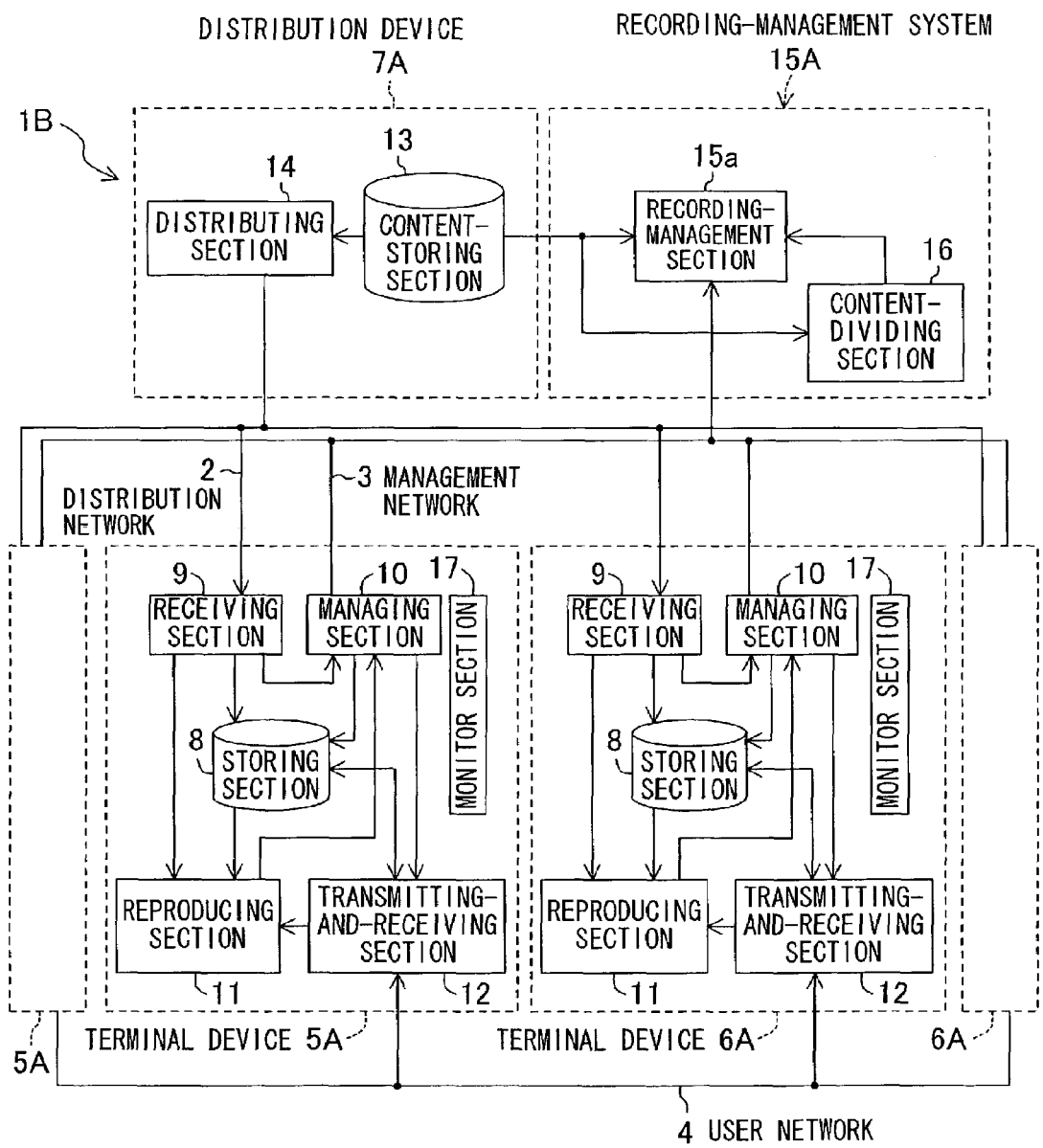
FIG. 3 is a diagram showing the configuration of a content distribution system according to Embodiment 2 of the present invention.

FIG. 3 shows the configuration of a content distribution system 1A according to Embodiment 2 of the invention. The same reference numerals are used to indicate the same parts as the content distribution system 1 according to Embodiment 1, which has been described above referring to FIGS. 1 and 2. The details of these same parts are not elaborated upon further.

The differences from Embodiment 1 are that a recording management system 15A is constituted by the recording management section 15a and a content-dividing section 16, and that each of terminal devices 5A and 6A further has a monitor section 17. It should be noted here that more than one terminal devices 5A and 6A are provided (two of each are provided in the example shown in FIG. 3).

The content-dividing section 16 provided in the recording management system 15A generates separate storing information for specifying, for a plurality of divided sub-contents, different terminal devices to which the plurality of divided sub-contents are stored respectively so that the plurality of sub-contents, which have been separated from a content distributed by the distributing section 14, can be stored in different terminal devices respectively. For example, the content distributed by the distributing section 14 is divided into two sub-contents, and the separate storing information is generated such that one of the terminal devices 5A is specified for one of the divided sub-contents whereas the other one of the terminal devices 5A is specified for the other one of the divided sub-contents. Each of the monitor sections 17 provided in the one or the other one of the terminals devices 5A monitors the content received by the receiving section 9 from the distributing section 14 provided in the distribution device 7A.

Figure 4:
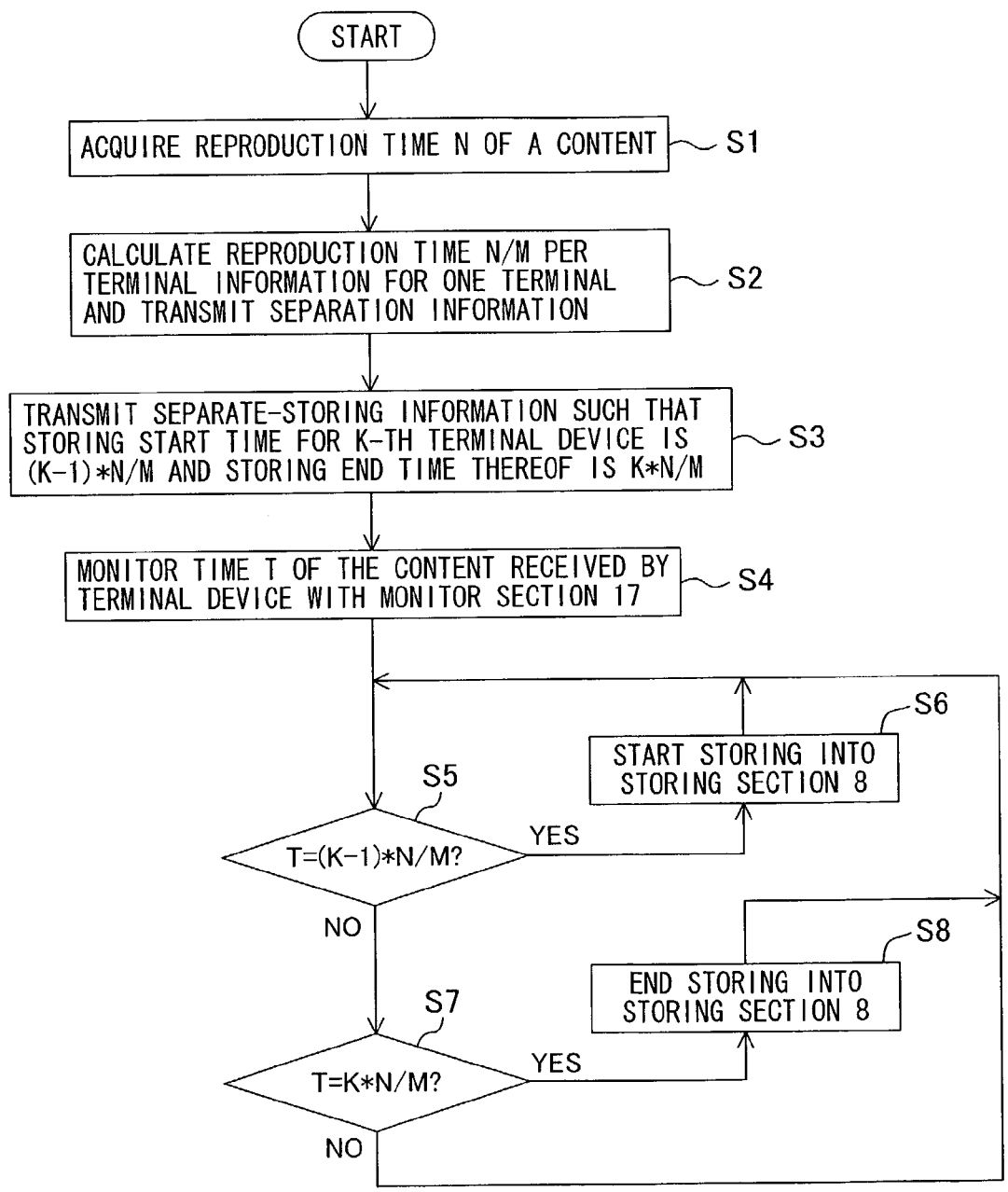
FIG. 4 is a flow-chart for illustrating the content distribution system according to Embodiment 2 of the present invention.

FIG. 4 is a flow-chart showing the operation of the content distribution system 1A. The content-dividing section 16 provided in the recording management system 15A acquires reproduction time N that indicates the time required for reproducing the content read out by the content-storing section 13 (S1). The content-dividing section 16 computes reproduction time (N/M) for the content that is to be stored in each one of the terminal devices 5A based on the reproduction time N of the content and the number M of the terminal devices 5A in which the divided contents are stored, and it outputs the computed reproduction time to the recording management section 15a (S2). The recording management section 15a transmits separate storing information to each of the managing sections 10 respectively provided in M number of terminal devices 5A such that, based on the reproduction time (N/M) of the content that is stored in each one of the terminal devices 5A, the reproduction time at which storing is to be started is $(K-1) \times (N/M)$ and the reproduction time at which storing is to be ended is $K \times (N/M)$ for the K-th terminal device ($1 \leq K \leq M$) among M terminal devices 5A in which the divided contents are stored (S3).

The receiving section 9 provided in the K-th terminal device 5A receives the content distributed from the distributing section 14 provided in the distribution device 7A. The monitor section 17 provided in the K-th terminal device 5A monitors reproduction time T of the content that the receiving section 9 is currently receiving. (S4).

Then, the monitor section 17 provided in the K-th terminal device 5A judges whether or not the current reproduction time T of the content that is being received by the receiving section 9 has reached $(K-1) \times (N/M)$, which is the reproduction time at which storing of the content is to be started (S5). If it is determined that the current reproduction time T for the content that the receiving section 9 is receiving has reached the reproduction time $(K-1) \times (N/M)$ at which storing of the content is to be started (if YES in step S5), the storing section 8 provided in the K-th terminal device 5A starts to store the content that the receiving section 9 is receiving (S6). If it is determined that the reproduction time T for the content that the receiving section 9 is receiving has not reached the reproduction time $(K-1) \times (N/M)$ at which storing of the content is to be started (if NO is step S5), then it is judged whether the reproduction time T of the content that the receiving section 9 is receiving has not reached the reproduction time $K \times (N/M)$ at which storing of the content is to be ended (S7). If it is determined that the reproduction time T for the content that the receiving section 9 is receiving has reached the reproduction time $K \times (N/M)$ at which the storing of the content is to be ended (if YES in step S7), the storing section 8 provided in the K-th terminal device 5A finishes storing the content that the receiving section 9 is receiving (S8). If it is determined that the reproduction time T has not reached the reproduction time $K \times (N/M)$ at which the storage is to be ended (if NO in step S7), or if the storing section 8 starts storing of the content that the receiving section 9 is receiving (S6), or if the storing section 8 finishes storing the content that the receiving section 9 is receiving (S8), the process returns to S5.

Thus, the storing section 8 provided in the K-th terminal device 5A starts storing a content when the current reproduction time T of the content that the receiving section 9 is receiving becomes the reproduction time $(K-1) \times (N/M)$ at which the storing of the content is to be started, and it finishes the storing of the content when the reproduction time K×(N/M) has reached.

For example, assume that the reproduction time N of a content is 60 minutes, the number M of terminal devices 5A to which the content is divided and stored is 2, and two terminal devices 5A are assigned respectively as a first terminal device 5A and a second terminal device 5A. The storing section 8 provided in the first terminal device 5A starts storing the content when the reproduction time T of the content that the receiving section 9 is receiving has reached the reproduction time (1−1)×(60/2)=0 minute at which storing of the content is to be started, and it finishes storing the content when the reproduction time has reached the reproduction time 1×(60/2)=30 minutes at which storing of the content is to be ended. The storing section 8 provided in the second terminal device 5A starts storing the content when the reproduction time T of the content that the receiving section 9 is receiving has reached the reproduction time (2−1)×(60/2)=30 minutes at which storing of the content is to be started, and it finishes storing the content when the reproduction time has reached the reproduction time 2×(60/2)=60 minutes at which storing of the content is to be ended. Thus, of the content having a reproduction time of 60 minutes, the content from the start of the reproduction time to 30 minutes is stored in the storing section 8 of the first terminal device 5A, whereas the content from 30 minutes to 60 minutes is stored in the storing section 8 of the second terminal device 5A.

The management section 10 provided in the terminal device 6A requests the recording management system 15A to send the content that is divided and stored in to M number of terminal devices 5A, the recording management system 15A transmits the addresses of M number of terminal devices 5A in which the divided content is stored, and the sequential order of the terminal devices 5A based on the reproduction time of the content stored by each of the terminal devices 5A, to the managing section 10. The managing section 10 provided in the terminal device 6A receives the addresses of the M number of the terminal devices 5A and the sequential order, and it outputs them to the transmitting-and-receiving section 12 provided in the terminal device 6A. The transmitting-and-receiving section 12 acquires each of the sub-contents from the M umber of terminal devices 5A, which are divided and stored therein, via the user network 4. The reproducing section 11 provided in the terminal device 6A sequentially reproduces the sub-contents acquired from the M number of terminal devices 5A.

As described above, according to Embodiment 2, of a plurality of sub-contents that are separated from a single content, respective sub-contents specified by separate storing information are recorded in M number of different terminal devices 5A. Therefore, even if one of the sub-contents is stolen from the storing section 8 provided in one of the M number of terminal devices, it is impossible to reproduce the entire content from the stolen sub-content. Thus, security can be tightened against theft of contents.

An example has been described in which a content is divided into sub-contents based on the reproduction time, but the present invention is not limited thereto. For example, a content may be divided into sub-contents based on the file size of the content. In this case, it is sufficient that the value of the reproduction time N of the content is replaced by the value of the file size, and the monitor section 17 monitor the file size of the content received by the receiving section 9.

The above description described an example in which a content is divided so that the sizes (reproduction time) of the sub-contents to be divided for storage are equal for each terminal device, but it is possible that the content is divided so that the sizes of the sub-contents to be divided for storage are different for each terminal device.

Figure 5:
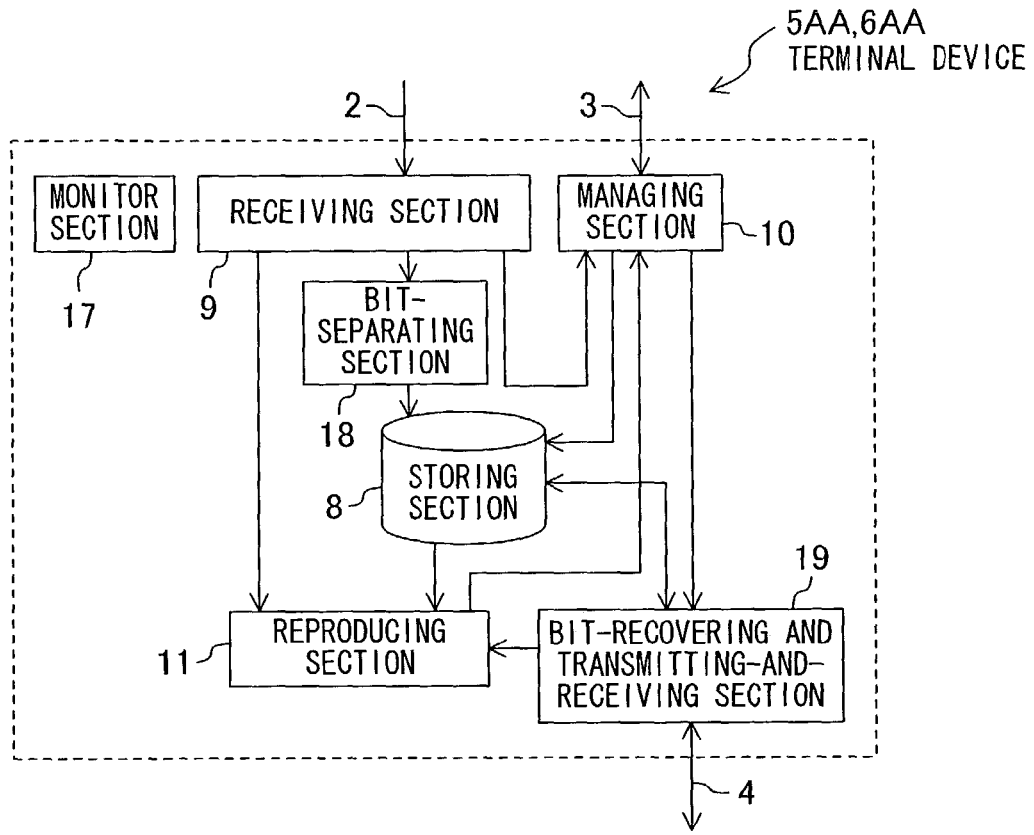
FIG. 5 is a diagram showing the configuration of another terminal device provided in the content distribution system of the present invention.

FIG. 5 shows the configuration of other terminal devices 5AA and 6AA in the content distribution system 1A according to Embodiment 2 of the invention. The same reference numerals are used to indicate the same parts as the terminal devices 5A and 6A, which have been described above referring to FIG. 3. The details of these same parts are not elaborated upon further. The differences from the above-described terminal devices are that a bit-separating section 18 is further provided and a bit-recovering and transmitting-and-receiving section 19 is provided in place of the transmitting-and-receiving section 12.

Figure 6:
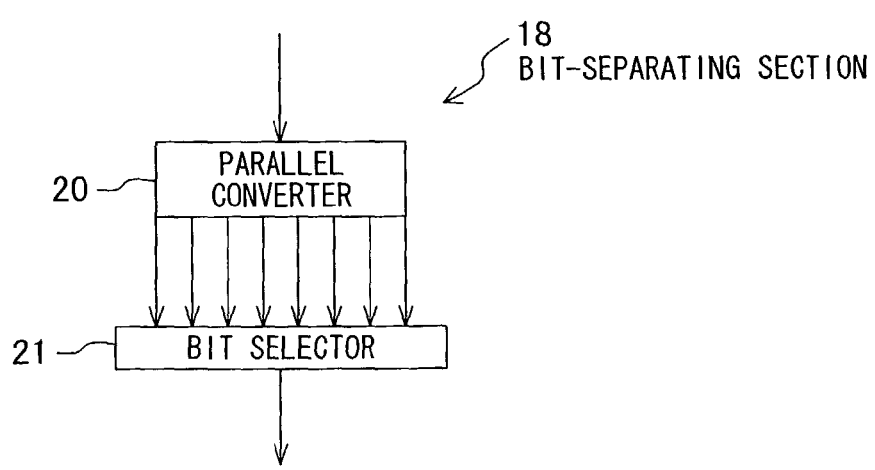
FIG. 6 is a diagram showing the configuration of a bit-separating section provided in the other terminal device according to Embodiment 2 of the present invention.

FIG. 6 shows the configuration of the bit-separating section 18. The bit-separating section 18 comprises a parallel converter 20 and a bit selector 21. The parallel converter 20 divides the content received by the receiving section 9 into eight sub-contents for each bit in bytes and outputs them to the bit selector 21. The bit selector 21 selects one of the eight sub-contents output from the parallel converter 20 that corresponds to a predetermined bit, and outputs the selected sub-content to the storing section 8. The bit-recovering and transmitting-and-receiving section 19 has a function of recovering the sub-contents divided by the bit-separating section 18 to be the original content, in addition to the function of the above-described transmitting-and-receiving section 12.

In the content distribution system 1A provided with the other terminal devices 5AA and 6AA thus configured, the content-dividing section 16 provided in the recording management system 15A outputs a number P that represents the number of sub-contents that have been bit-separated from the content to the recording management section 15a. The recording management section 15a transmits, as separate storing information, a bit position indicating the sub-content that is to be stored by the K-th (1≦K≦M) terminal device 5AA of the P number of terminal devices 5AA, in which the P number of sub-contents that have been bit-separated are stored, to the managing section 10 of the K-th (1≦K≦M) terminal device 5AA. For example, assume that a content is divided into 8 sub-contents in bytes bit-by-bit and the 8 divided sub-contents are stored into 8 terminal devices 5AA. The bit positions indicating the sub-contents to be stored in the 8 terminal devices 5AA are respectively transmitted as separate storing information to the managing sections 10 provided in the 8 terminal devices 5AA so that the first terminal device 5AA stores the sub-content for the 1st bit of the 8 divided sub-contents that are divided bit-by-bit, the second terminal device 5AA stores the sub-content for the 2nd bit thereof, and the k-th (1≦k≦8) terminal device 5AA stores the sub-content for the k-th bit.

The receiving section 9 provided in the terminal device 5AA receives the content distributed from the distributing section 14 provided in the distribution device 7A. The managing section 10 provided in the terminal device 5AA receives, as separate storing information, the bit position indicating the sub-content to be stored, from the recording management section 15a. The parallel converter 20 provided in the bit-separating section 18 divides the content received by the receiving section 9 bit-by-bit into 8 sub-contents in bytes and outputs them to the bit selector 21. Based on the bit position indicated by the separate storing information that is received by the managing section 10 provided in the terminal device 5AA, the bit selector 21 selects one of the 8 sub-contents output from the parallel converter 20 that corresponds to the bit position indicated by the separate storing information, and it outputs the selected sub-content to the writing section 34 provided in the storing section 8. The write section 34 provided in the storing section 8 stores the one of the sub-contents that is output from the bit selector 21 provided in the bit-separating section 18 into the user space 38 provided in the storage medium 36.

When the managing section 10 provided in the terminal device 6AA requests the recording management system 15A to send the content that has been bit-separated and stored in the P number of terminal devices 5AA, the recording management system 15A transmits the addresses of the P number of terminal devices 5AA in which the content is bit-separated and stored, and the bit positions of the sub-contents stored by the respective terminal devices 5AA, to the managing section 10 provided in the terminal device 6AA. The managing section 10 provided in the terminal device 6AA receives the addresses of the P number of terminal devices 5AA and the bit positions, and outputs them to the bit-recovering and transmitting-and-receiving section 19. The bit-recovering and transmitting-and-receiving section 19 provided in the terminal device 6AA obtains the sub-contents that have been bit-separated and stored, from the P number of terminal devices 5AA via the user network 4, respectively. The bit-recovering and transmitting-and-receiving section 19 provided in the terminal device 6AA recovers the obtained sub-contents to be the original content. The reproducing section 11 reproduces the content recovered by the bit-recovering and transmitting-and-receiving section 19.

Thus, according to Embodiment 2, a plurality of sub-contents that is a content that have been bit-separated are recorded into a P number of different terminal devices 5AA. Therefore, even if one of the sub-contents is stolen from the storing section 8 provided in one of the P number of terminal devices 5AA, neither the entire content nor the stolen sub-content itself can be reproduced since the sub-contents are bit-separated. Thus, security can be further tightened against theft of contents.

It should be noted that the above description of Embodiment 2 has shown an example in which each of the sub-contents separated from a content is stored in one terminal device, but the present invention is not limited to this example. It is also possible that one of the sub-contents separated from a content may be stored into a plurality of terminal devices. In this case, even if one of the terminal devices that stores the sub-contents has become unable to transmit one of the sub-contents, there is another terminal device that stores the same sub-content and therefore the other terminal device can transmit the sub-content. Thus, the content that is divided and stored into a plurality of terminal devices can be reproduced reliably.

EMBODIMENT 3

Figure 7:
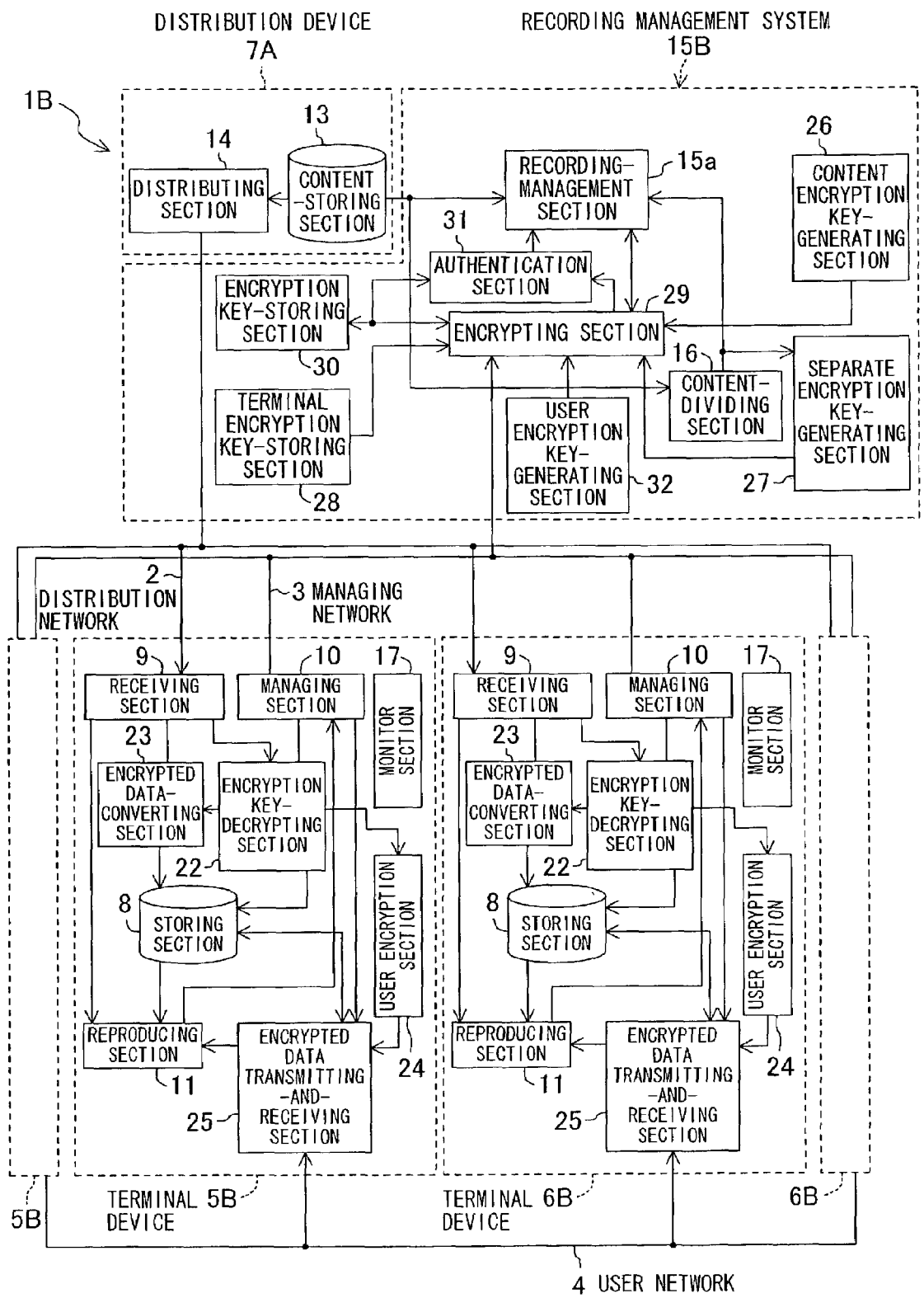
FIG. 7 is a diagram showing the configuration of a content distribution system according to Embodiment 3 of the present invention.

FIG. 7 shows the configuration of a content distribution system 1B according to Embodiment 3 of the invention. The same reference numerals are used to indicate the same parts as the content distribution system 1A according to Embodiment 2, which has been described above referring to FIG. 3. The details of these same parts are not elaborated upon further.

The content distribution system 1B comprises a distribution device 7A, a recording management system 15B, and terminal devices 5B and 6B, all of which are connected to each other by a distribution network 2. The recording management system 15B and the terminal devices 5B and 6B are also connected to each other by a management network 3. The terminal device 5B and 6B are connected to each other by a user network 4.

The recording management system 15B comprises, in addition to the content-dividing section 16, a content encryption key-generating section 26, a separate encryption key-generating section 27, a terminal encryption key-storing section 28, an encrypting section 29, an encryption key-storing section 30, an authentication section 31, and a user encryption key-generating section 32.

The content encryption key-generating section 26 generates a content encryption key for encrypting the content received from the distributing section 14 provided in the distribution device 7A by the receiving section 9, provided in each of the terminal devices 5B and 6B, and it outputs the generated encryption key to the encrypting section 29. The content encryption key-generating section 26 generates a different content encryption key for each content to be encrypted.

The separate encryption key-generating section 27 generates a separate encryption key for encrypting the sub-contents separated from the content read out by the content-storing section 13 based on the separate storing information generated by the content-dividing section 16, and it outputs the generated encryption key to the encrypting section 29. The separate encryption key-generating section 27 generates a different content encryption key for each sub-content to be encrypted.

The user encryption key-generating section 32 generates a user encryption key for encrypting the sub-content that is transmitted and received via the user network 4, and it outputs the generated encryption key to the encrypting section 29. The user encryption key is changed to a different one each time the second terminal device 6B requests distribution of a content.

The terminal encryption key-storing section 28 stores terminal encryption keys each individually given for the terminal devices 5B and 6B.

The encrypting section 29 transmits an encrypted content encryption key that is made by encrypting the content encryption key generated by the content encryption key-generating section 26, an encrypted separate encryption key that is made by encrypting the separate encryption key generated by the separate encryption key-generating section 27, encrypted content storage-controlling information made by encrypting the content storage control information generated by the recording management section 15a, encrypted separate storing information made by encrypting the separate storing information generated by the content-dividing section 16, and an encrypted user encryption key made by encrypting the user encryption key generated by the user encryption key-generating section 32, to the managing section 10 provided in the terminal device 5B via the management network 3.

The encryption key-storing section 30 stores the content encryption key generated by the content encryption key-generating section 26 and the separate encryption key generated by the separate encryption key-generating section 27.

The authentication section 31 authenticates a terminal device that has transmitted an authentication request based on the terminal encryption key stored in the terminal encryption key-storing section 28.

The terminal device 5B is provided with an encryption key-decrypting section 22. The encryption key-decrypting section 22 decrypts the encrypted content encryption key, the encrypted separate encryption key, the encrypted content storage-controlling information, the encrypted separate storing information, the encrypted user encryption key, all of which are received from the encrypting section 29 by the managing section 10, to obtain the content encryption key, the separate encryption key, the content storage control information, the separate storing information, and the user encryption key, respectively.

The terminal device 5B is also provided with an encrypted data-converting section 23. The encrypted data-converting section 23 encrypts the content received from the distributing section 14 provided in the distribution device 7A by the receiving section 9 based on the content encryption key decrypted by the encryption key-decrypting section 22 to obtain an encrypted content.

The terminal device 5B has a user encryption section 24. The user encryption section 24 encrypts the content to be transmitted to another terminal device via the user network 4 based on the user encryption key decrypted by the encryption key-decrypting section 22 to obtain a user encrypted content. The terminal device 5B is provided with an encrypted data transmitting-and-receiving section 25. The encrypted data transmitting-and-receiving section 25 transmits the user encrypted content encrypted by the user encryption section 24 to the encrypted data transmitting-and-receiving section 25 provided in another terminal device via the user network 4, and it receives the user encrypted content transmitted from the encrypted data transmitting-and-receiving section 25 provided in another terminal device.

The operation of the content distribution system 1B thus configured is described below. The content-storing section 13 provided in the distribution device 7A reads out stored content, outputs the read content to the distributing section 14, and also outputs the information that identifies the type, the file size, the reproduction time, and so forth of the read content to the recording management section 15a. The distributing section 14 distributes the content read out by the content-storing section 13 to both the terminal device 5B and the terminal device 6B through the distribution network 2. The recording management section 15a identifies the type, file size, reproduction time, and so forth of the content read out by the content-storing section 13 and generates content storage control information for specifying the sub-contents to be stored into a plurality of terminal devices 5B.

The content encryption key-generating section 26 provided in the recording management system 15B generates a different content encryption key for each content read out by the content-storing section 13, and outputs the encryption key to the encrypting section 29. The encrypting section 29 encrypts the content encryption key generated by the content encryption key-generating section 26 as well as the content storage control information generated by the content-dividing section 16 of the recording management system 15B, and it transmits the encrypted content encryption key and the encrypted content storage-controlling information to the managing section 10 provided in the terminal device 5B.

Next, the operation of the terminal device 5B is described below. The receiving section 9 provided in the terminal device 5B receives the content distributed from the distributing section 14 through the distribution network 2. The receiving section 9 outputs information for identifying the received content to the encryption key-decrypting section 22. The reproducing section 11 reproduces the content received by the receiving section 9. The managing section 10 receives the encrypted content encryption key and the encrypted content storage-controlling information, which have been encrypted by the encrypting section 29 provided in the recording management system 15B through the management network 3.

The encryption key-decrypting section 22 provided in the terminal device 5B decrypts the encrypted content encryption key and the encrypted content storage-controlling information received by the managing section 10 to obtain the content encryption key and the content storage control information, respectively, and outputs the decrypted content encryption key to the encrypted data-converting section 23. The encrypted data-converting section 23 encrypts the content received by the receiving section 9 to obtain an encrypted content based on the content encryption key output from the encryption key-decrypting section 22.

The encryption key-decrypting section 22 provided in the terminal device 5B outputs a write signal to the writing section 34 provided in the storing section 8 when the information for identifying the content received by the receiving section 9 and the sub-content specified by the decrypted content storage control information match.

When the writing section 34 provided in the storing section 8 receives the write signal from the encryption key-decrypting section 22, it stores the encrypted content encrypted by the encrypted data-converting section 23 into the user space 38 provided in the storage medium 36, and it records information for managing the encrypted content stored in the user space 38 into the shared space 37 provided in the storage medium 36.

The reproducing section 11 provided in the terminal device 6B outputs a content-requesting signal for requesting the desired content to the managing section 10 provided in the terminal device 6B when a desired content is neither being received by the receiving section 9 of the terminal device 6B nor stored in the storing section 8 of the terminal device 6B. When the managing section 10 provided in the terminal device 6B receives the content-requesting signal output from the reproducing section 11, it makes an authentication request for requesting the desired content to the authentication section 31 provided in the recording management system 15B through the encrypting section 29. The authentication section 31 that has received the authentication request requests the managing section 10 provided in the terminal device 6B through the encrypting section 29 to transmit a terminal encryption key.

The managing section 10 that has received a request for the terminal encryption key transmits the terminal encryption key stored in the storing section 8 to the authentication section 31. When the terminal encryption key transmitted from the managing section 10 provided in the terminal device 6B and the terminal encryption key stored in the terminal encryption key-storing section 28 match, the authentication section 31 authenticates the terminal device 6B that made the authentication request as genuine, and it requests the recording management section 15a to send the desired content.

When the recording management system 15 receives the request for the desired content from the authentication section 31, the recording management system 15 outputs a terminal address that identifies the terminal device in which the desired content has already been stored, for example, the terminal device 5B, to the encrypting section 29, as in Embodiment 1. The encrypting section 29 encrypts the terminal address output from the recording management section 15a and the user encryption key generated by the user encryption key-generating section 32 based on the terminal encryption key stored in the terminal encryption key-storing section 28, to obtain an encrypted terminal address and an encrypted user encryption key, respectively, and it transmits the encrypted terminal address and the encrypted user encryption key to the managing section 10 provided in the terminal device 6B through the management network 3. The managing section 10 provided in the terminal device 6B receives the encrypted terminal address and the encrypted user encryption key from the encrypting section 29. The encryption key-decrypting section 22 decrypts the encrypted terminal address and the encrypted user encryption key, received by the managing section 10, to obtain the terminal address and the user encryption key, respectively, and outputs the decrypted terminal address to the encrypted data transmitting-and-receiving section 25 and the decrypt user encryption key to the user encryption section 24.

When the encrypted data transmitting-and-receiving section 25 provided in the terminal device 6B receives the terminal address from the encryption key-decrypting section 22, it sends out a content transfer-requesting signal for requesting the desired content to the encrypted data transmitting-and-receiving section 25 provided in the terminal device 5B that is identified by the received terminal address through the user network 4.

When the encrypted data transmitting-and-receiving section 25 provided in the terminal device 5B receives the content transfer-requesting signal, the reading section 35 provided in the storing section 8 of the terminal device 5B reads out an encrypted content that is the desired content that has been encrypted, from the user space 38. The encrypted data transmitting-and-receiving section 25 of the terminal device 5B transfers the encrypted content read out by the reading section 35 provided in the storing section 8 to the encrypted data transmitting-and-receiving section 25 provided in the terminal device 6B through the user network 4. The encrypted data transmitting-and-receiving section 25 provided in the terminal device 6B receives the transferred encrypted content. The user encryption section 24 provided in the terminal device 6B the encrypted content received by the encrypted data transmitting-and-receiving section 25 to obtain a content, based on the user encryption key output from the encryption key-decrypting section 22. The reproducing section 11 provided in the terminal device 6B reproduces the content decrypted by the user encryption section 24.

Next, the following describes an example in which a plurality of sub-contents separated from a content distributed by the distributing section 14 are stored in different terminal devices, as in Embodiment 2 described above.

The content-storing section 13 provided in the distribution device 7A reads out the stored content, outputs the read content to the distributing section 14, and outputs information for identifying the type, the file size, the reproduction time, and so forth of the read content to the recording management section 15a. The distributing section 14 distributes the content read out by the content-storing section 13 to both the terminal device 5B and the terminal device 6B through the distribution network 2.

The content-dividing section 16 provided in the recording management system 15B generates separate storing information for specifying, for the plurality of divided sub-contents, different terminal devices to which the plurality of divided sub-contents are stored respectively so that the plurality of sub-contents, which have been separated from a content distributed by the distributing section 14, can be stored in different terminal devices respectively.

The separate encryption key-generating section 27 generates a separate encryption key for encrypting the sub-contents, which have been separated from the content read out by the content-storing section 13, based on the separate storing information generated by the content-dividing section 16, and it outputs the encryption key to the encrypting section 29.

The encrypting section 29 encrypts the separate encryption key generated by the separate encryption key-generating section 27 as well as the separate storing information generated by the content-dividing section 16, and it transmits the encrypted separate encryption key and the encrypted separate storing information to the managing section 10 provided in the terminal device 5B.

Next, the operation of the terminal device 5B is described below. The receiving section 9 provided in the terminal device 5B receives the content distributed from the distributing section 14 through the distribution network 2. The receiving section 9 outputs the information for identifying the received content to the encryption key-decrypting section 22. The reproducing section 11 reproduces the content received by the receiving section 9.

The managing section 10 receives the encrypted separate encryption key and the encrypted separate storing information that have been encrypted by the encrypting section 29 provided in the recording management system 15B, through the management network 3.

The encryption key-decrypting section 22 provided in the terminal device 5B decrypts the encrypted separate encryption key and the encrypted separate storing information that have been received by the managing section 10 to obtain a separate encryption key and separate storing information, and outputs the decrypted separate encryption key and the decrypted separate storing information to the encrypted data-converting section 23. The encrypted data-converting section 23 selects one of the sub-contents, which have been separated from a content received by the receiving section 9, based on the separate storing information output from the encryption key-decrypting section 22, and it encrypts the selected sub-content based on the separate encryption key output from the encryption key-decrypting section 22 to obtain an encrypted sub-content.

The encryption key-decrypting section 22 provided in the terminal device 5B outputs a write signal to the writing section 34 provided in the storing section 8 when the information for identifying the content received by the receiving section 9 and the content specified by the decrypted separate storing information match.

When the writing section 34 provided in the storing section 8 received the write signal from the encryption key-decrypting section 22, it stores the encrypted sub-content encrypted by the encrypted data-converting section 23 into the user space 38 provided in the storage medium 36 and records the information for managing the stored encrypted sub-content into the shared space 37 provided in the storage medium 36.

The reproducing section 11 provided in the terminal device 6B outputs a content-requesting signal for requesting a desired content to the managing section 10 provided in the terminal device 6B when the desired content is neither being received by the receiving section 9 of the terminal device 6B nor stored in the storing section 8 of the terminal device 6B. When the managing section 10 receives the content-requesting signal output from the reproducing section 11, it makes an authentication request for requesting the desired content to the authentication section 31 provided in the recording management system 15B through the encrypting section 29. The authentication section 31 that has received the authentication request requests the managing section 10 provided in the terminal device 6B through the encrypting section 29 to transmit a terminal encryption key.

The managing section 10 that has received a request for the terminal encryption key transmits the terminal encryption key stored in the storing section 8 to the authentication section 31. When the terminal encryption key transmitted from the managing section 10 provided in the terminal device 6B and the terminal encryption key stored in the terminal encryption key-storing section 28 match, the authentication section 31 authenticates the terminal device 6B that made the authentication request as genuine, and it requests the recording management section 15a to send the desired content.

When the recording management section 15a receives the request for the desired content from the authentication section 31, it outputs a plurality of terminal addresses that identify a plurality of the terminal devices in which the sub-contents, which are separated from the desired content, have already been stored, for example, the addresses identifying the terminal devices 5B, to the encrypting section 29, as in Embodiment 2 described above. The encrypting section 29 encrypts a plurality of the terminal addresses output from the recording management section 15a and the user encryption key generated by the user encryption key-generating section 32 based on the terminal encryption key stored in the terminal encryption key-storing section 28, to obtain a plurality of encrypted terminal addresses and an encrypted user encryption key, respectively, and it transmits the encrypted terminal addresses and the encrypted user encryption key to the managing section 10 provided in the terminal device 6B through the management network 3. The managing section 10 provided in the terminal device 6B receives a plurality of the encrypted terminal addresses and the encrypted user encryption key from the encrypting section 29. The encryption key-decrypting section 22 decrypts a plurality of the encrypted terminal addresses and the encrypted user encryption key, which have been received by the managing section 10, to obtain a plurality of the terminal addresses and the user encryption key, respectively, and outputs a plurality of the decrypted terminal addresses to the encrypted data transmitting-and-receiving section 25 and the decrypt user encryption key to the user encryption section 24.

When the encrypted data transmitting-and-receiving section 25 provided in the terminal device 6B receives a plurality of the terminal addresses from the encryption key-decrypting section 22, it sends out a sub-content transfer-requesting signal for requesting the sub-content, separated from the desired content, to the encrypted data transmitting-and-receiving section 25 provided in each of plurality of the terminal devices 5B that are identified by a plurality of the received terminal addresses, through the user network 4.

When the encrypted data transmitting-and-receiving section 25 provided in the terminal device 5B receives the sub-content transfer-requesting signal, the reading section 35 provided in the storing section 8 of the terminal device 5B reads out an encrypted sub-content that is a sub-content that has been separated from the desired content and has been encrypted, from the user space 38. The encrypted data transmitting-and-receiving section 25 of the terminal device 5B transfers the encrypted sub-content read out by the reading section 35 provided in the storing section 8 to the encrypted data transmitting-and-receiving section 25 provided in the terminal device 6B through the user network 4.

The encrypted data transmitting-and-receiving section 25 provided in the terminal device 6B receives the encrypted sub-contents transferred from a plurality of the terminal devices 5B respectively. The user encryption section 24 provided in the terminal device 6B decrypts each of the encrypted sub-content received by the encrypted data transmitting-and-receiving section 25 based on the user encryption key output from the encryption key-decrypting section 22, to obtain each of the sub-contents. The reproducing section 11 provided in the terminal device 6B reproduces the desired content based on the sub-contents decrypted by the user encryption section 24.

According to Embodiment 3 described above, the recording management system 15B has the content encryption key-generating section 26 that generates a content encryption key for encrypting a content, and content encryption key-generating section 26 generates a different content encryption key for each content. The recording management system 15B transmits the content encryption key generated by the content encryption key-generating section 26 to the terminal device 5B through the management network 3, and the terminal device 5B encrypts the content based on the content encryption key transmitted from the recording management system 15B through the management network 3 and stores the encrypted content into the storing section 8. Thus, a content is encrypted with an encryption key different for each content and is then stored. As a result, security of the content stored in the storing section 8 can be tightened.

In another example, the recording management system 15B has a separate encryption key-generating section 27 that generates a plurality of separate encryption keys for encrypting a plurality of sub-contents, which are separated from a content, and each of the plurality of the separate encryption keys generated by the separate encryption key-generating section 27 is different for each of plurality of the sub-contents. The recording management system 15B transmits a plurality of the separate encryption keys generated by the separate encryption key-generating section 27 to different first terminal devices 5B respectively, through the management network 3. Each of the first terminal devices 5B encrypts a sub-content with a separate encryption key transmitted from the recording management system 15B through the management network 3, and stores the encrypted sub-content into the storing section 8. Thus, the sub-contents are encrypted with the encryption keys, each different for each sub-content, and are stored in each of the storing sections. As a result, it is possible to reduce the likelihood that the sub-contents that are encrypted and stored in the storing sections 8 in other terminal devices even if a sub-content that is encrypted and stored in the storing section 8 in a certain terminal device is stolen by decrypting an encryption key.

EMBODIMENT 4

Figure 8:
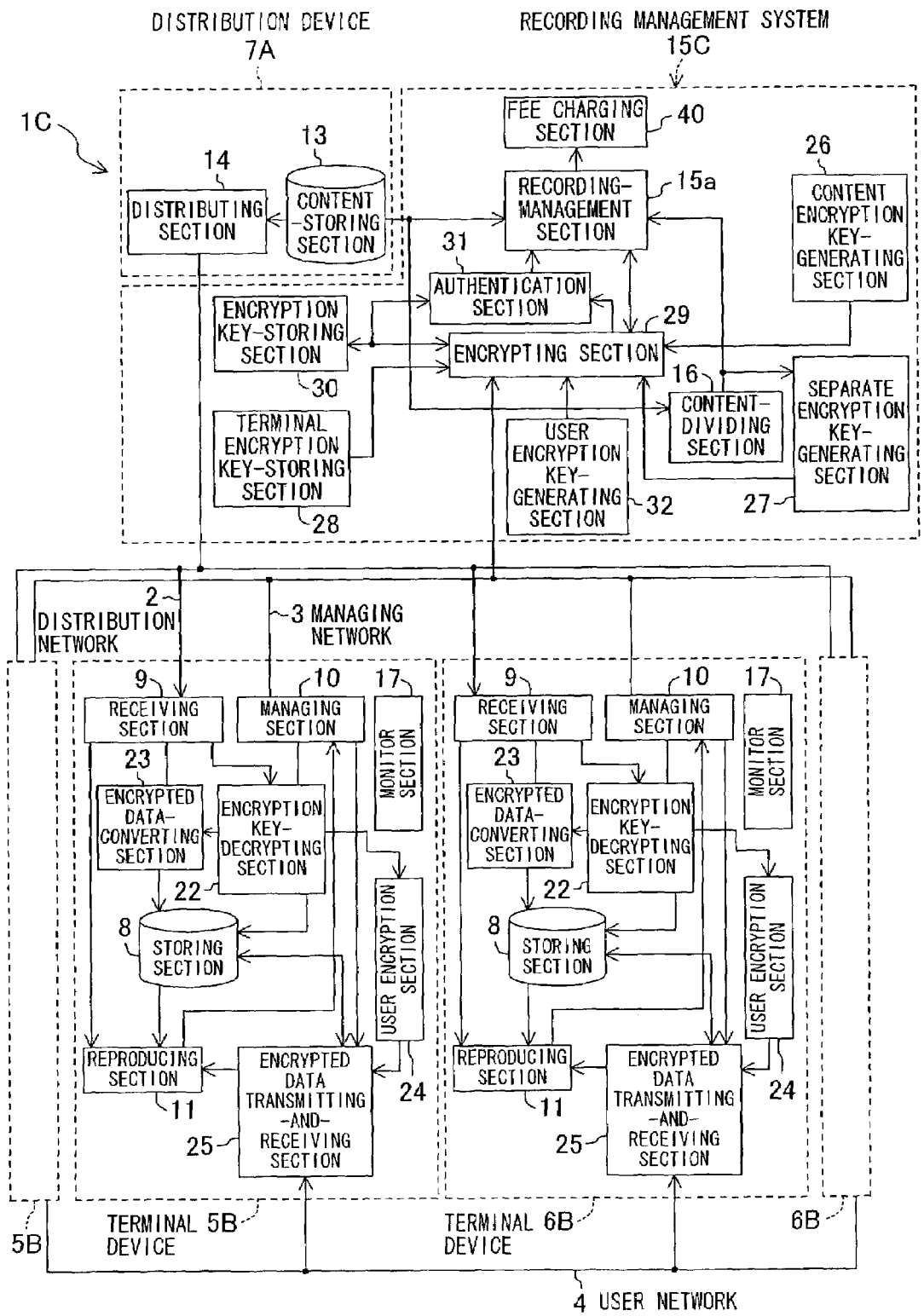
FIG. 8 is a diagram showing the configuration of a content distribution system according to Embodiment 4 of the present invention.

FIG. 8 shows the configuration of a content distribution system 1C according to Embodiment 4 of the invention. The same reference numerals are used to indicate the same parts as the content distribution system 1B according to Embodiment 3, which has been described above referring to FIG. 7. The details of these same parts are not elaborated upon further.

A difference from the content distribution system 1B according to Embodiment 3 is that a recording management system 15C is provided in place of the recording management system 15B. The recording management system 15C further has a fee charging section 40. The fee charging section 40 is for charging a terminal device that makes a request for distribution of a content. This charging is performed as follows. When a terminal device makes a request for distribution of a content, another terminal device transmits a stored sub-content. Therefore, the fee is reduced for the terminal device that transmits the stored sub-content. In addition, the terminal devices are controlled by the recording management system so that they obligatorily store predetermined sub-contents, and for this reason, fee charging becomes imbalanced between a plurality of the terminal devices according to whether the stored sub-content is often requested from other terminal devices or not. In view of this, a measure to make the charging balanced is taken, as will be discussed later.

Figure 9:
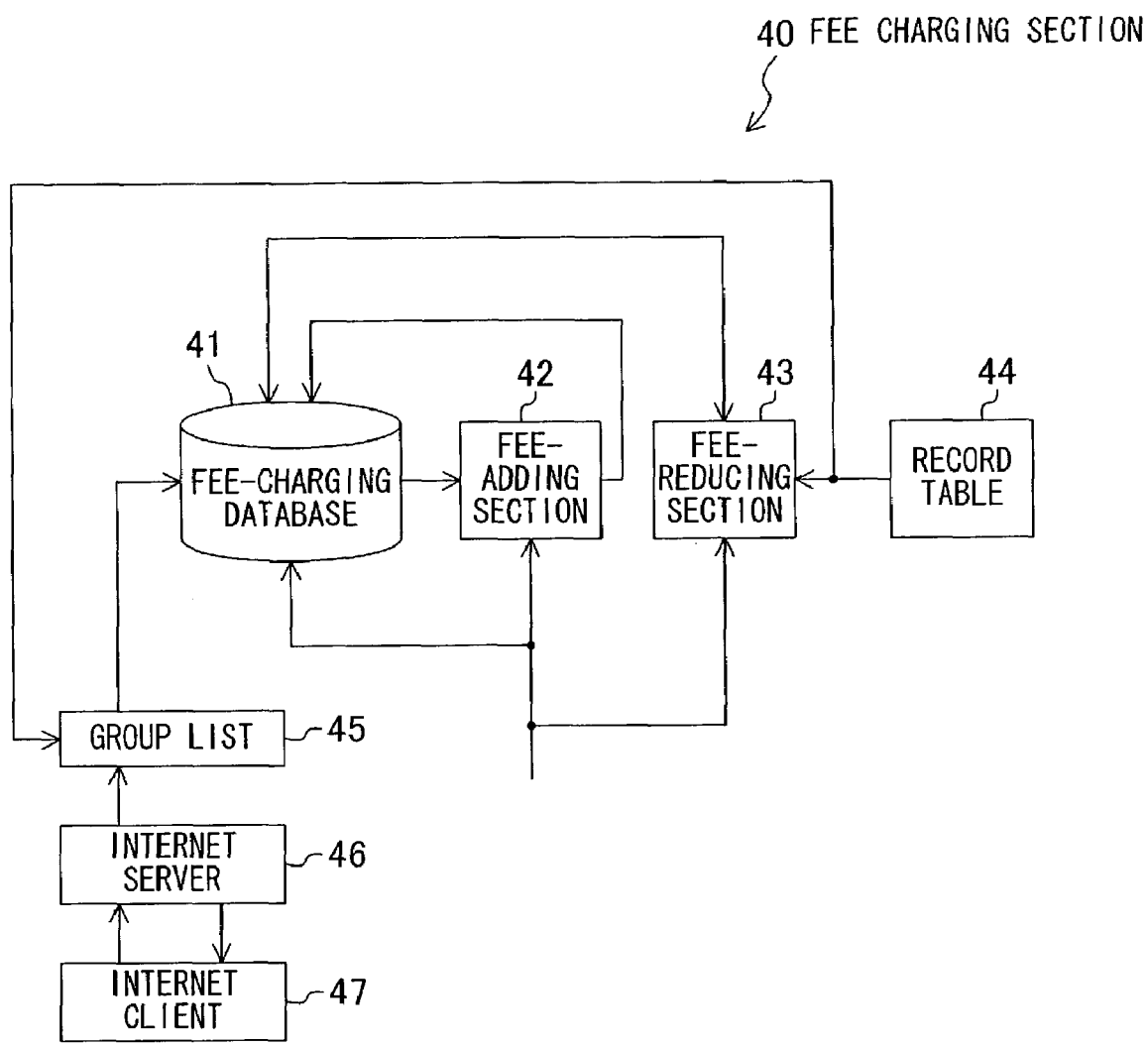
FIG. 9 is a diagram showing the configuration of a fee charging section provided in the content distribution system according to Embodiment 4 of the present invention.
Figure 10:
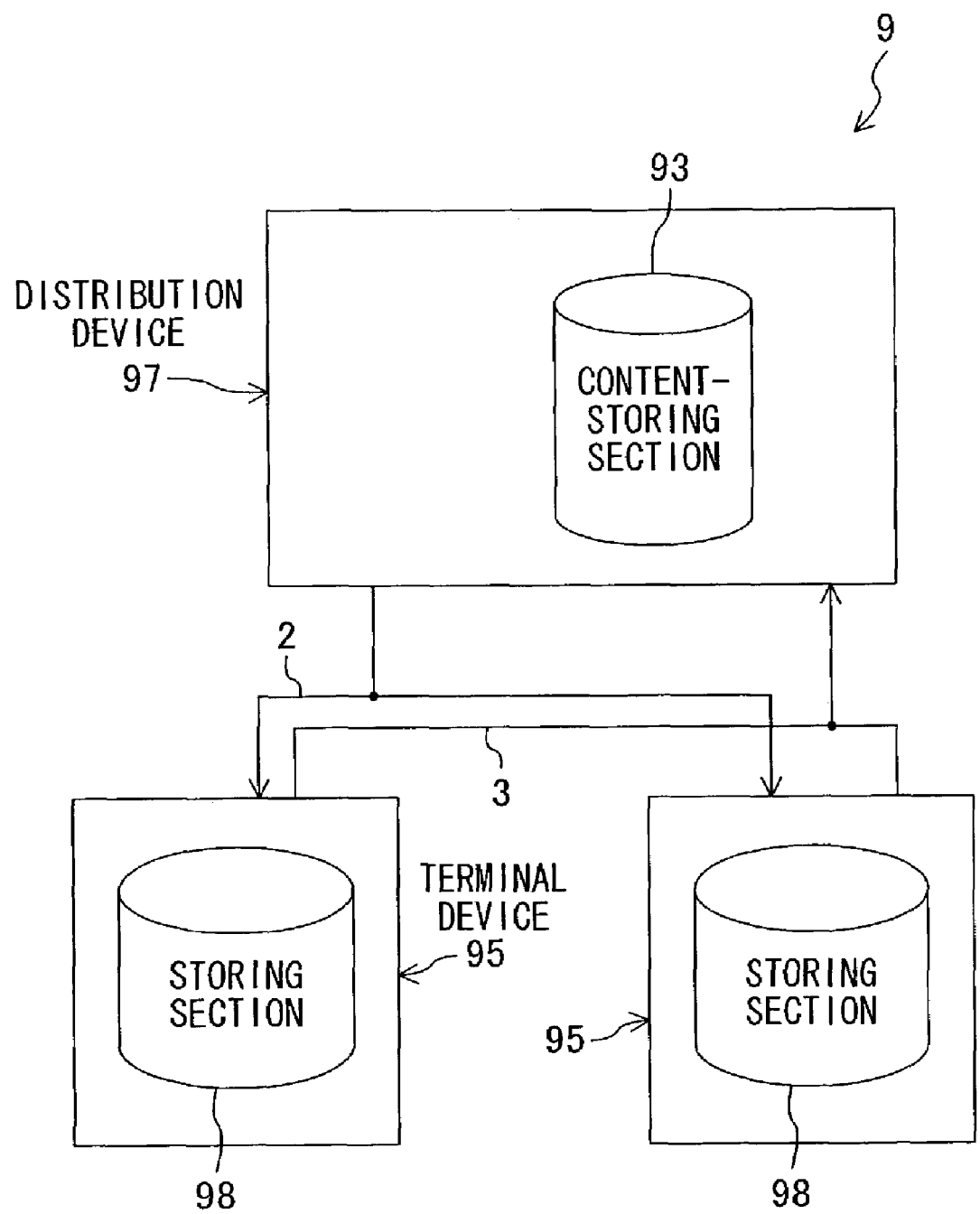
FIG. 10 is a diagram showing the configuration of a conventional content distribution system.

FIG. 9 shows the configuration of the fee charging section 40. The fee charging section 40 comprises a fee-charging database 41. The fee-charging database 41 stores terminal addresses for identifying a terminal device 6B that has made a request for a content to the recording management section 15a, terminal addresses for identifying a terminal device 5B that has transmitted, to the terminal device 6B, the content that the terminal device 6B requested the recording management section 15a to send, and total fee amount data representing the total amount of fee charge that the terminal devices 5B and 6B are to be charged.

The fee charging section 40 is provided with a fee-adding section 42. The fee-adding section 42 adds a fee amount that is to be charged to the terminal device 6B that has made a request for a content, to the total fee amount data stored in the fee-charging database 41, and stores the total fee amount data to which the fee amount has been added into the fee-charging database 41.

The fee charging section 40 also has a fee-reducing section 43. The fee-reducing section 43 subtracts a transmission fee for transmitting a content from the total fee amount data for the terminal device 5B that has transmitted, to the terminal device 6B, the content that the terminal device 6B requested the recording management section 15a to send.

The fee charging section 40 also has a record table 44. The record table 44 records the data amounts of the contents stored in the storing sections 8 in the terminal devices. The record table 44 may record the sizes of the user spaces 38 and the shared spaces 37 in the storing sections 8 of the terminal devices.

The fee charging section 40 further has a group list table 45. The group list table 45 records a group list containing a plurality of groups made of a plurality of terminal devices. All the groups recorded in the group list table 45 and the addresses of the terminal devices that constitute the groups are transmitted as a group signal to the fee-charging database 41.

The group list table 45 of the fee charging section 40 is connected to an Internet server 46, and the Internet server 46 is connected to an Internet client 47. The Internet client 47 edits the group list and transmits the edited group list to the Internet server 46. The Internet server 46 records the group list transmitted from the Internet client 47 into the group list table 45 of the fee charging section 40.

In a content distribution system 1C thus configured, when the managing section 10 provided in the terminal device 6B receives a content-requesting signal output from the reproducing section 11, the managing section 10 makes a request for authentication to the authentication section 31 provided in the recording management system 15C. The authentication section 31 that receives the request for authentication requests the managing section 10 provided in the terminal device 6B to transmit a terminal encryption key.

The managing section 10 that received a request for the terminal encryption key transmits the terminal encryption key stored in the storing section 8 to the authentication section 31. When the terminal encryption key transmitted from the managing section 10 provided in the terminal device 6B and the terminal encryption key stored in the terminal encryption key-storing section 28 match, the authentication section 31 authenticates the terminal device 6B that made the authentication request as genuine, and it requests the recording management section 15a to send the desired content.

When the recording management section 15a receives the request for the desired content from the authentication section 31, it outputs a plurality of terminal addresses that identify a plurality of the terminal devices in which the sub-contents, which are separated from the desired content, have already been stored, for example, the addresses identifying the terminal devices 5B, to the encrypting section 29, as in Embodiment 2 described above.

The recording management section 15a also outputs fee charge calculation information to the fee charging section 40. The fee charge calculation information contains a terminal address that identifies the terminal device 6B that has made a request for a desired content, a plurality of terminal addresses that respectively identify a plurality of the terminal devices 5B in which the sub-contents separated from the desired content requested by the terminal device 6B are stored, and information that identifies the desired content requested by the terminal device 6B.

The fee-charging database 41 transmits total fee amount data representing the total fee amount that the terminal device 6B is to be charged, to the fee-adding section 42, based on the terminal address that identifies the terminal device 6B that has made a request for a desired content. The fee-charging database 41 also transmits, to the fee-reducing section 43, total fee amount data representing the totals of the fee amounts that a plurality of the terminal devices 5B are to be charged, based on a plurality of the terminal addresses that respectively identify a plurality of the terminal devices 5B in which the sub-contents separated from the desired content are stored.

The fee-adding section 42 adds a predetermined additional fee amount to the total fee amount data for the terminal device 6B, based on the information that identifies the desired content requested by the terminal device 6B and the number of a plurality of the terminal addresses that respectively identify a plurality of the terminal devices 5B, and transmits the total fee amount data to which the predetermined additional fee amount has been added to the fee-charging database 41.

An example of the method of calculating the predetermined additional fee amount to be added is shown by the following Equation 1.

Additional fee amount=(additional fee amount for each sub-content)×(number of terminal addresses that identify terminal devices 5B)   Eq. 1

Thus, the additional fee amount is calculated based on the number of terminal addresses that identify a plurality of the terminal devices 5B in which the sub-contents separated from the desired content are stored. Therefore, fee charging according to reproduction time or file size is possible without monitoring the reproduction time or the file sizes of the sub-contents. As a consequence, it is possible to reduce the scale of the calculating circuit that calculates the additional fee amounts.

When the fee-reducing section 43 receives the total fee amount data representing the total of the fee amount that the terminal device 5B is to be charged from the fee-charging database 41, the fee-reducing section 43 subtracts a predetermined amount from the total fee amount data of the terminal device 5B and transmits the total fee amount data from which the predetermined amount has been subtracted, to the fee-charging database 41. Thus, when a given terminal device transmits a sub-content or a content to another terminal device, the fee amount for the terminal device that has transmitted the sub-content the content is reduced.

The fee-reducing section 43 may subtract another predetermined amount from the total fee amount data based on the data amount of the content stored in the storing section 8 of each of the terminal devices, which is recorded in the record table 44.

Furthermore, further another predetermined amount may be subtracted from the total fee amount data based on the sizes of the shared space 37 and the user space 38 in the storing section 8 in each of the terminal devices, which are recorded in the record table 44.

All the groups that are recorded in the group list table 45 and the addresses of the terminal devices that constitute the groups are transmitted as a group signal to the fee-charging database 41. The fee-adding section 42 evenly adds the fee amount for all the terminal devices in the group to which the terminal device 6B that has requested a content belongs, based on the group signal transmitted to the fee-charging database 41. Thus, excessive fee charging to a particular terminal device does not occur.

The Internet server 46 distributes the group list recorded in the group list table 45 to the Internet client 47. The Internet client 47 edits the distributed group list and transmits the edited group list to the Internet server 46. The Internet server 46 registers the group list edited by the Internet client 47 in the group list table 45. When the Internet is thus used to register the group list in the group list table 45, the content distribution system can be constructed using less system resource.

According to Embodiment 4 as described above, the recording management system 15C has the fee charging section 40 that calculates the fee amount that a terminal device that has made a request for a content is to be charged, and therefore, the fee amount that is to be charged to the terminal device that has requested the content can be easily calculated.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A content distribution system comprising:
   a plurality of terminal devices;
   a distribution device for storing predetermined contents and distributing the contents; and
   a recording management system;
   wherein the recording management system comprises a content-dividing section which generates seperate storing information regarding in which one of the plurality of terminal devices a specified sub-content of a plurality of sub-contents comprising a single piece of the contents distributed from the distribution device is to be stored, and the content-dividing section transmitting the separate storing information to the plurality of terminal devices;
   wherein each of the plurality of terminal devices comprises a storing section,
   wherein each of the plurality of terminal devices further comprises a reproducing section for reproducing the single piece of the contents before being divided by the content-dividing section,
   wherein each of the plurality of terminal devices receives the whole single piece of the contents distributed from the distribution device and is forced to store in the storing section only the specified sub-content of the single piece of the contents having been distributed based on the separate storing information transmitted from the content-dividing section, and
   wherein, when any one of the terminal devices requests distribution of the single piece of the contents for reproduction by using its own reproducing section, the recording management system manages transmission and reception of the stored sub-contents between the terminal device that has made the request and one or the plurality of the terminal devices each storing the specified sub-content.

2. The content distribution system according to claim 1, wherein:
   the plurality of terminal devices include a plurality of first terminal devices;
   the plurality of first terminal devices and the recording management system are connected by a management network;
   the recording management system transmits content storage control information for specifying a content to be stored to each of the first terminal devices through the management network; and
   the content-dividing section of the recording management system transmits, to each of the first terminal devices through the management network, the separate storing information that specifies a predetermined sub-content in the content specified by the content storage control information for each of the first terminal devices;
   wherein each of the first terminal devices comprises:
   a receiving section connected to the distribution device through a distribution network, the receiving section receiving predetermined contents from the distribution device;
   a storing section;
   a managing section connected to the management network, the managing section receiving the content storage control information sent from the recording management system and the separate storing information sent from the content-dividing section and storing a sub-content into the storing section, the sub-content corresponding to the received separate storing information among the plurality of sub-contents that consist of the content corresponding to the received content storage control information among the contents received by receiving section.

3. The content distribution system according to claim 2, wherein:
   the plurality of terminal devices include a second terminal device that makes a request for distribution of a content;
   the content-dividing section of the recording management system transmits, to the second terminal device, addresses of the plurality of the first terminal devices that store the content when the content-dividing section receives a content distribution-requesting signal from the second terminal device; and the content-dividing section of the recording management system allows the second terminal device and the first terminal devices having the received addresses to transmit and receive the content stored in the first terminal devices therebetween.

4. The content distribution system according to claim 3, wherein:
the second terminal device comprises:
a managing section connected to the management network, the managing section transmitting a distribution-requesting signal for requesting distribution of a content to the recording management system; and
a reproducing section for reproducing the content;
wherein the content-dividing section of the recording management system transmits addresses of the first terminal devices that store the content to the managing section of the second terminal device when the content-dividing section receives the distribution-requesting signal from the second terminal device;
wherein the first terminal device has a first transmitting-and-receiving section;
wherein the second terminal device has a second transmitting-and-receiving section connected to the first transmitting-and-receiving section of each of the first terminal devices through a user network;
wherein the second transmitting-and-receiving section of the second terminal device transmits a sub-content-requesting signal for requesting a sub-content through the user network to the first terminal devices having the addresses received by the managing section; and
wherein the first transmitting-and-receiving section of each of the first terminal devices transmits the sub-content stored in the storing section through the user network to the second transmitting-and-receiving section of the second terminal device that has transmitted the sub-content-requesting signal.

5. The content distribution system according to claim 2, wherein the distribution network includes broadcasting.

6. The content distribution system according to claim 2, wherein the distribution network includes at least one of the Internet and a local area network.

7. The content distribution system according to claim 2, wherein the management network comprises at least one of the Internet and a local area network.

8. The content distribution system according to claim 4, wherein the user network comprises at least one of the Internet and a local area network.

9. The content distribution system according to claim 2, wherein:
the separate storing information contains bit-position-specifying information that specifies a bit position for each of the first terminal devices;
each of the first terminal device comprises a bit-separating section that generates the plurality of sub-contents by dividing the content received by the receiving section for each bit and selects one of the plurality of sub-contents divided for each bit based on the bit position specified by the bit-position-specifying information for each of the first terminal devices; and
one of the plurality of sub-contents that has been selected by the bit-separating section is stored in the storing section.

10. The content distribution system according to claim 1, wherein the size of the plurality of sub-contents is determined based on a predetermined reproduction time.

11. The content distribution system according to claim 1, wherein the size of the plurality of sub-contents is determined based on a predetermined file size.

12. The content distribution system according to claim 2, wherein:
the recording management system has a content encryption key-generating section that generates a content encryption key for encrypting the contents in the distribution device;
the recording management system transmits the content encryption key generated by the content encryption key-generating section to each of the first terminal devices through the management network; and
each of the first terminal devices encrypts the content received by the receiving section based on the content encryption key transmitted from the recording management system through the management network.

13. The content distribution system according to claim 12, wherein the content encryption key-generating section generates a different content encryption key for each content.

14. The content distribution system according to claim 12, wherein:
the recording management system has an encrypting section that encrypts the content encryption key generated by the content encryption key-generating section to be an encrypted content encryption key;
the recording management system transmits the encrypted content encryption key encrypted by the encrypting section to each of the first terminal devices through the management network;
each of the first terminal devices has an encryption key-decrypting section that decrypts the encrypted content encryption key transmitted from the recording management system to obtain the content encryption key; and
each of the first terminal devices encrypts the content received by the receiving section based on the content encryption key decrypted by the encryption key-decrypting section.

15. The content distribution system according to claim 2, wherein:
the recording management system has separate encryption key-generating section that generates a plurality of separate encryption keys for encrypting the plurality of sub-contents;
the recording management system respectively transmits the separate encryption keys generated by the separate encryption key-generating section through the management network to the different first terminal devices; and
each of the first terminal devices encrypts the sub-content corresponding to the received separate storing information based on the separate encryption key transmitted from the recording management system through the management network and stores the sub-content into the storing section.

16. The content distribution system according to claim 3, wherein the recording management system comprises an authentication section that authenticates a second terminal device that requests distribution of the content.

17. The content distribution system according to claim 16, wherein:
the recording management system has a terminal encryption key-storing section that stores terminal encryption keys each uniquely given for each of the terminal devices; and
the authentication section compares the terminal encryption key transmitted from the second terminal device that requests distribution of the content and the terminal encryption key stored in the terminal encryption key-storing section to authenticate the second terminal device that requests distribution of the content.

18. The content distribution system according to claim 4, wherein:
the recording management system has a user encryption key-generating section that generates a user encryption key for encrypting sub-contents transmitted and received through the user network;
each of the first terminal devices encrypts the sub-content stored in the storing section with the user encryption key generated by the user encryption key-generating section to obtain a user encrypted sub-content, and transmits the encrypted sub-content through the user network to the second terminal device that has requested distribution of the content; and
the second terminal device that has requested distribution of the content decrypts the encrypted sub-content transmitted from the first terminal device through the user network with the user encryption key generated by the user encryption key-generating section.

19. The content distribution system according to claim 18, wherein the user encryption key-generating section changes a user encryption key to be generated each time one of the second terminal devices makes a request for distribution of a content.

20. The content distribution system according to claim 2, wherein the storing section of each of the first terminal devices comprises:
a shared space that stores a sub-content specified by the recording management system; and
a user space that is freely available to a user who owns the first terminal device.

21. The content distribution system according to claim 20, wherein the storing section of each of the first terminal devices comprises a space-setting section that sets the size of the shared space and the size of the user space.

22. The content distribution system according to claim 21, wherein the recording management system transmits an instruction signal that instructs the space-setting section on the size of the shared space to the space-setting section.

23. The content distribution system according to claim 19, wherein a space-setting section sets the size of the shared space according to an instruction from a user who owns the terminal device that has the space-setting section.

24. The content distribution system according to claim 4, wherein the first terminal device and the second terminal device have their functions in common and the same configuration so that the first terminal device can also function as the second terminal device whereas the second terminal device can also function as the first terminal device.

25. The content distribution system according to claim 24, wherein the recording management system has a fee charging section that calculates a fee amount that a terminal device is to be charged when the terminal device makes a request for a content to the recording management system as the second terminal device.

26. The content distribution system according to claim 25, wherein, when the terminal device makes a request for a content as the second terminal device, the fee charging section calculates the fee amount that the second terminal device is to be charged based on the number of the first terminal device(s) that stores/store the sub-contents that constitutes the content.

27. The content distribution system according to claim 25, wherein:
the fee charging section has a group list table that records a group list showing a plurality of groups constituted by a plurality of terminal devices; and
according to the group list table, the fee charging section evenly adds a fee amount over all the terminal devices that belong to the group to which the second terminal device that has requested the content belongs.

28. The content distribution system according to claim 27, wherein:
the group list table is connected to an Internet server;
the Internet server is connected to an Internet client; the Internet client edits the group list; and
the Internet server registers the group list edited by the Internet client into the group list table.

29. A terminal device for use in the content distribution system according to claim 4, the terminal device having both the function that the first terminal device has and the function that the second terminal device has.

30. A storing section provided in the first terminal device for use in the content distribution system according to claim 2, the storing section converting the format of the sub-content received by the receiving section into a format different from the format as the sub-content is distributed.

31. The content distribution system according to claim 1 further comprising a user network, wherein upon the request of any one of the terminal devices, the stored sub-contents are directly transferred between the plurality of terminal devices through the user network.

32. The content distribution system according to claim 1, wherein upon the request of any oneof the terminal devices, the stored sub-contents are transferred between the plurality of terminal devices through the user, based on the separate storing information sent from the content-dividing section of the management system to the terminal device having made the request, without using the recording management system and the distribution device.

* * * * *